US012711984B2

(12) United States Patent
Okubo

(10) Patent No.: US 12,711,984 B2
(45) Date of Patent: Aug. 18, 2026

(54) MAGNETIC DISK DEVICE AND METHOD

(71) Applicants: Kabushiki Kaisha Toshiba, Kawasaki (JP); Toshiba Electronic Devices & Storage Corporation, Kawasaki (JP)

(72) Inventor: Tomokazu Okubo, Saitama Saitama (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/313,224

(22) Filed: Aug. 28, 2025

(65) Prior Publication Data

US 2026/0171109 A1 Jun. 18, 2026

(30) Foreign Application Priority Data

Dec. 18, 2024 (JP) ................................ 2024-221846

(51) Int. Cl.
*G11B 5/09* (2006.01)
*G11B 20/12* (2006.01)

(52) U.S. Cl.
CPC ............ *G11B 5/09* (2013.01); *G11B 20/1217* (2013.01); *G11B 2020/1238* (2013.01)

(58) Field of Classification Search
CPC .................. G11B 5/09; G11B 20/1217; G11B 2020/1238
See application file for complete search history.

(56) References Cited

U.S. PATENT DOCUMENTS

| | | | | |
|---|---|---|---|---|
| 9,715,887 | B2 | 7/2017 | Wilson et al. | |
| 9,754,610 | B2 | 9/2017 | Wilson et al. | |
| 9,761,268 | B1 | 9/2017 | Trantham et al. | |
| 9,875,757 | B1 | 1/2018 | Liu et al. | |
| 10,522,184 | B1 | 12/2019 | Granz et al. | |
| 11,900,964 | B2 * | 2/2024 | Okubo | G11B 20/10027 |
| 12,176,002 | B1 * | 12/2024 | Maeto | G11B 20/1217 |
| 2013/0083419 | A1 * | 4/2013 | Springberg | G11B 5/09 |
| 2017/0330591 | A1 * | 11/2017 | Granz | G11B 7/126 |
| 2021/0090606 | A1 * | 3/2021 | Tomoda | G11B 20/1217 |
| 2022/0246173 | A1 * | 8/2022 | Guo | G11B 5/02 |

* cited by examiner

*Primary Examiner* — Andrew Sasinowski

(74) *Attorney, Agent, or Firm* — Kim & Stewart LLP

(57) ABSTRACT

According to an embodiment, a processing circuit of a magnetic disk device modulates a recording width in the radial direction of a first data sequence depending on a first combination and a second combination when writing data to a first track. The first track is adjacent to a second track in which data is already written. The first combination is a combination of the first data sequence that is data written to the first track and a second data sequence that is data already written to the second track. The second combination is a combination of polarities at the bit position of the first track and the bit position of the second track adjacent to each other in the radial direction.

20 Claims, 17 Drawing Sheets

1
SoC
30
25
RWC
24
PREAMPLIFIER
29
DRAM
28
FROM
26
PROCESSOR
21
SVC
HDC
23
2
HOST
I/F BUS
11
12
13
15
16
22 (22w, 22r)
CONTROL SIGNAL
DATA

FIG.4

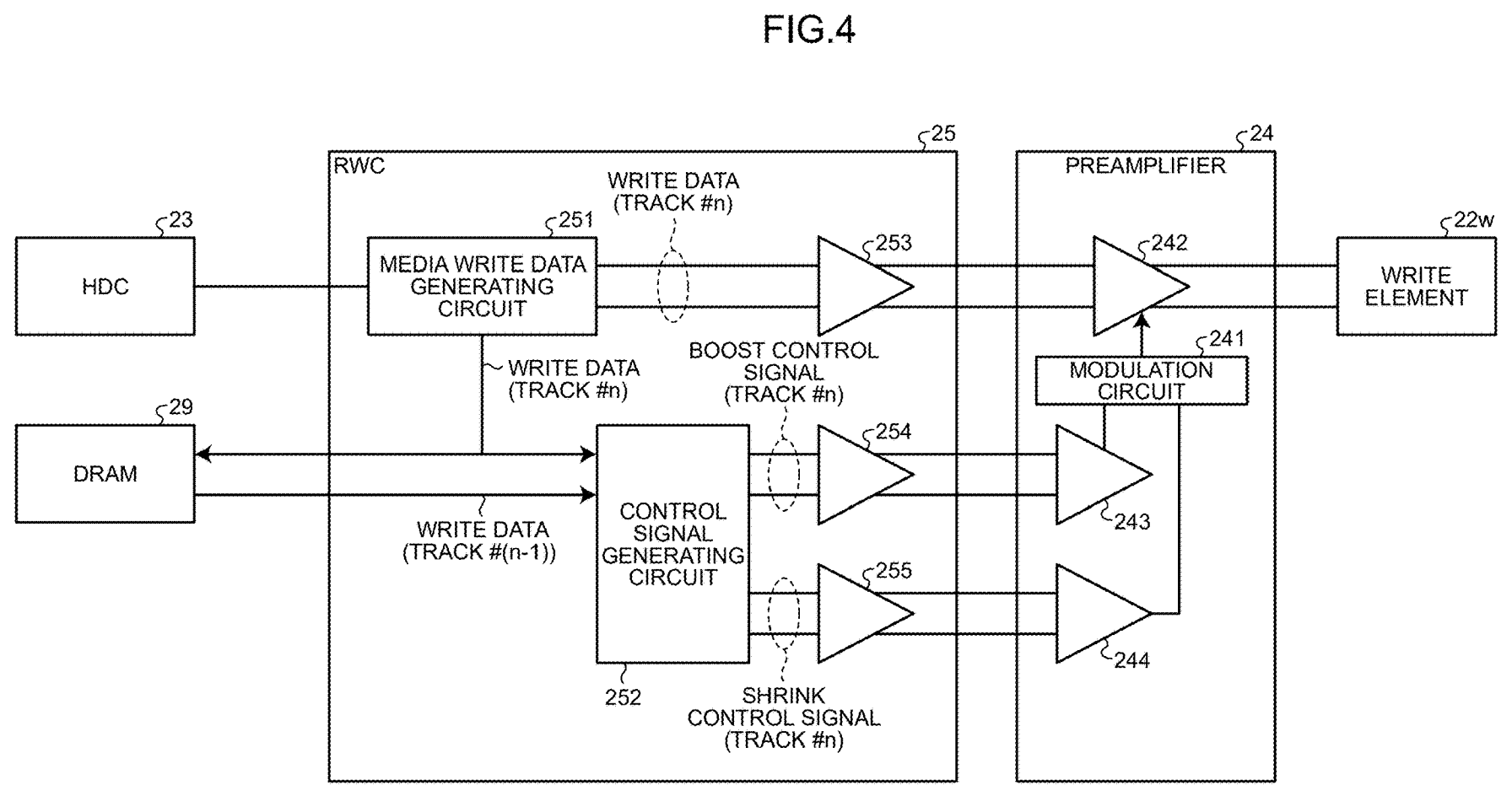

22w WRITE ELEMENT
24 PREAMPLIFIER
241 MODULATION CIRCUIT
242
243
244
25 RWC
251 MEDIA WRITE DATA GENERATING CIRCUIT
252 CONTROL SIGNAL GENERATING CIRCUIT
253
254
255
WRITE DATA (TRACK #n)
BOOST CONTROL SIGNAL (TRACK #n)
SHRINK CONTROL SIGNAL (TRACK #n)
WRITE DATA (TRACK #n)
WRITE DATA (TRACK #(n-1))
23 HDC
29 DRAM

CONTROL SIGNAL GENERATING CIRCUIT
252
WRITE DATA (TRACK #n)
WRITE DATA (TRACK #(n-1))
FIRST DATA PROCESSING CIRCUIT (TRACK #n)
101
FIRST PRE-COMPENSATION CIRCUIT (PATTERN: PP(n))
102
SECOND DATA PROCESSING CIRCUIT (TRACK #(n+1))
103
SECOND PRE-COMPENSATION CIRCUIT (PATTERN: PP(n-1))
104
POLARITY COMPARING CIRCUIT (XNOR OR XOR)
105
106
BOOST AND SHRINK CONTROL SIGNAL

NRZI (TRACK #(n-1))
1 0 0 1 1 1 0 1 0 0
WRITE DATA (TRACK #(n-1))
β (i-5) β (i-4) β (i-3) β (i-2) β (i-1) β (i) β (i+1) β (i+2) β (i+3) β (i+4) β (i+5)
WRITE DATA (TRACK #n)
α (i-5) α (i-4) α (i-3) α (i-2) α (i-1) α (i) α (i+1) α (i+2) α (i+3) α (i+4) α (i+5)
NRZI (TRACK #n)
0 1 0 0 1 1 1 1 0 1
CS2
CS1
MAGNETIZATION STATE (TRACK #(n-1))
MAGNETIZATION STATE (TRACK #n)
RECORDING RADIO WAVEFORM (TRACK #n)
WRITE DATA SIGNAL (TRACK #n)
BOOST CONTROL SIGNAL (TRACK #n)
t1
t0
TIME
... "1" OR POSITIVE POLARITY
... "0" OR NEGATIVE POLARITY

WRITE DATA (TRACK #(n-1))
WRITE DATA (TRACK #n)
β (i-5)
β (i-4)
β (i-3)
β (i-2)
β (i-1)
β (i)
β (i+1)
β (i+2)
β (i+3)
β (i+4)
β (i+5)
α (i-5)
α (i-4)
α (i-3)
α (i-2)
α (i-1)
α (i)
α (i+1)
α (i+2)
α (i+3)
α (i+4)
α (i+5)
MAGNETIZATION STATE (TRACK #(n-1))
MAGNETIZATION STATE (TRACK #n)
RECORDING RADIO WAVEFORM (TRACK #n)
WRITE DATA SIGNAL (TRACK #n)
BOOST CONTROL SIGNAL (TRACK #n)
t3
t2
TIME
... "1" OR POSITIVE POLARITY
... "0" OR NEGATIVE POLARITY

FIG.11

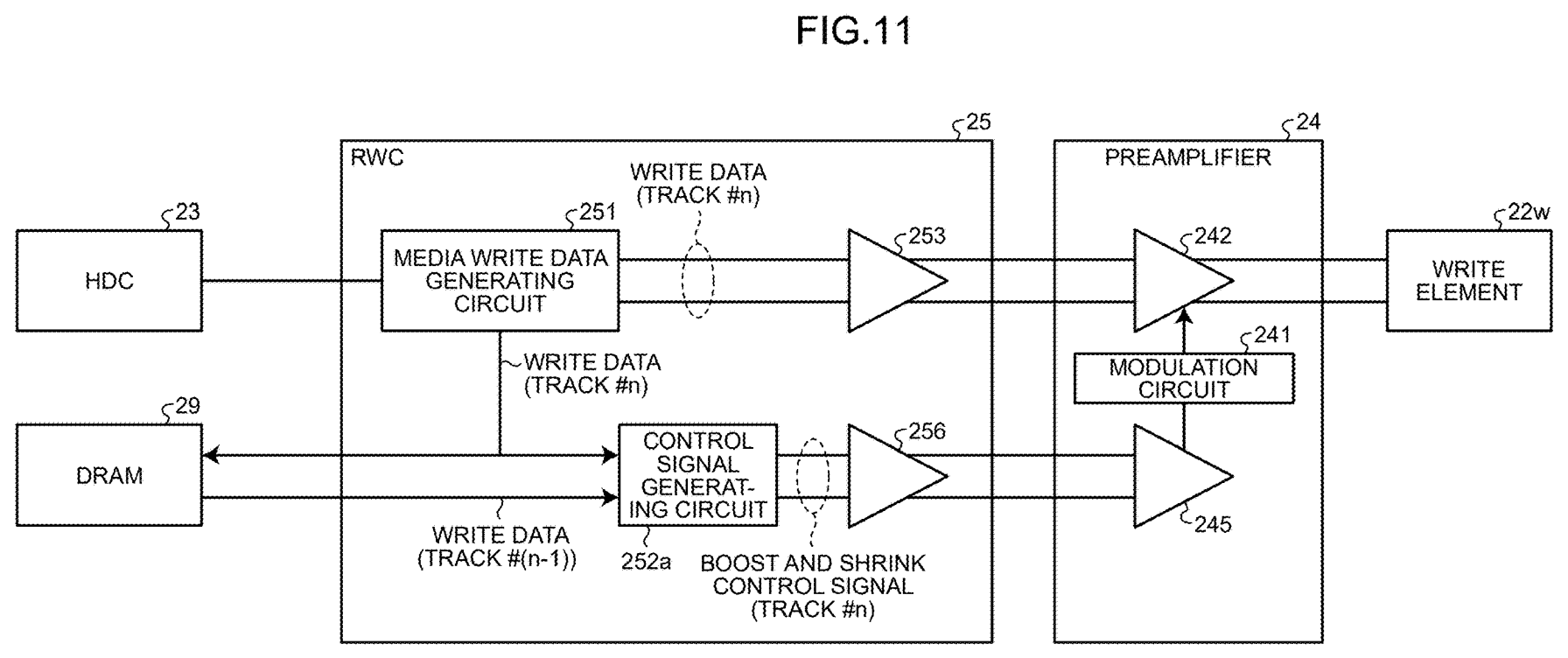

22w WRITE ELEMENT

24 PREAMPLIFIER

242

241 MODULATION CIRCUIT

245

25 RWC

253

256

WRITE DATA (TRACK #n)

BOOST AND SHRINK CONTROL SIGNAL (TRACK #n)

252a CONTROL SIGNAL GENERATING CIRCUIT

251 MEDIA WRITE DATA GENERATING CIRCUIT

WRITE DATA (TRACK #n)

WRITE DATA (TRACK #(n-1))

23 HDC

29 DRAM

FIG.12

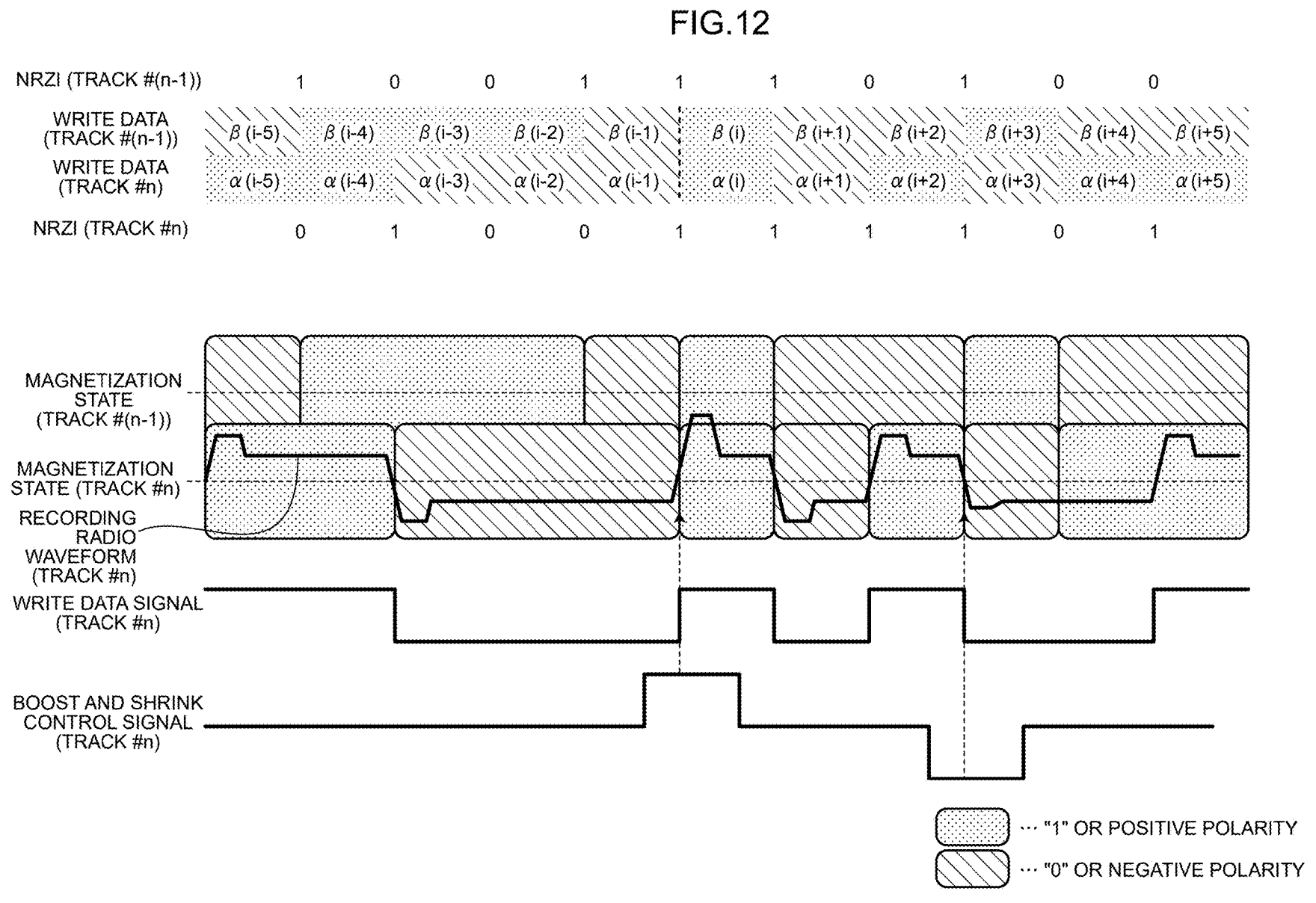

NRZI (TRACK #(n-1))

WRITE DATA (TRACK #(n-1))

WRITE DATA (TRACK #n)

NRZI (TRACK #n)

MAGNETIZATION STATE (TRACK #(n-1))

MAGNETIZATION STATE (TRACK #n)

RECORDING RADIO WAVEFORM (TRACK #n)

WRITE DATA SIGNAL (TRACK #n)

BOOST AND SHRINK CONTROL SIGNAL (TRACK #n)

1 0 0 1 1 0 1 1 0 0

β (i-5) β (i-4) β (i-3) β (i-2) β (i-1) β (i) β (i+1) β (i+2) β (i+3) β (i+4) β (i+5)

α (i-5) α (i-4) α (i-3) α (i-2) α (i-1) α (i) α (i+1) α (i+2) α (i+3) α (i+4) α (i+5)

0 1 0 0 1 1 1 1 0 1

... "1" OR POSITIVE POLARITY

... "0" OR NEGATIVE POLARITY

WRITE DATA (TRACK #(n-1))
WRITE DATA (TRACK #n)
β (i-5)
β (i-4)
β (i-3)
β (i-2)
β (i-1)
β (i)
β (i+1)
β (i+2)
β (i+3)
β (i+4)
β (i+5)
α (i-5)
α (i-4)
α (i-3)
α (i-2)
α (i-1)
α (i)
α (i+1)
α (i+2)
α (i+3)
α (i+4)
α (i+5)
ε < th_ε
MAGNETIZATION STATE (TRACK #(n-1))
MAGNETIZATION STATE (TRACK #n)
RECORDING RADIO WAVEFORM (TRACK #n)
WRITE DATA SIGNAL (TRACK #n)
BOOST CONTROL SIGNAL (TRACK #n)
... "1" OR POSITIVE POLARITY

FIG.14

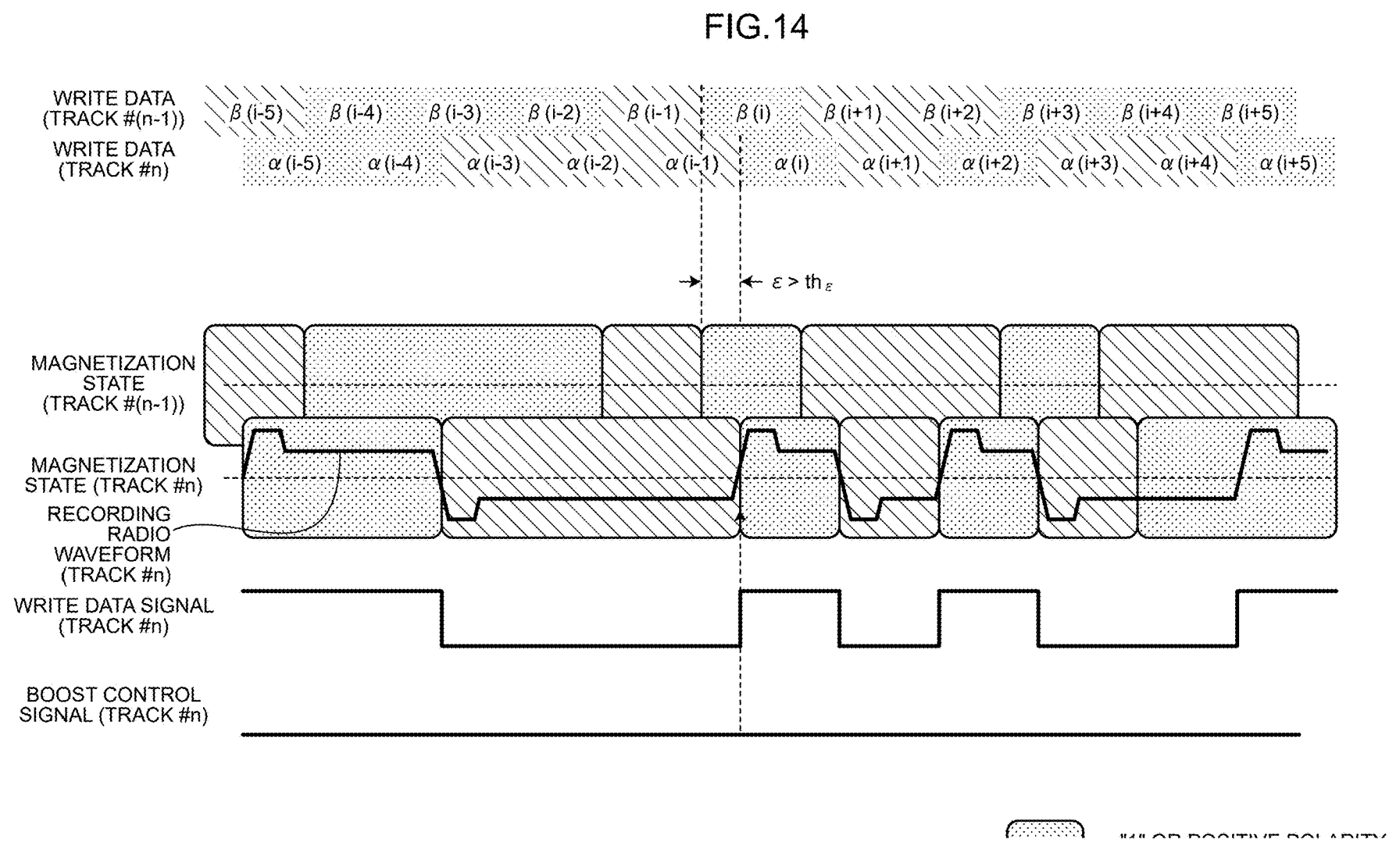

WRITE DATA (TRACK #(n-1))

WRITE DATA (TRACK #n)

β (i-5) β (i-4) β (i-3) β (i-2) β (i-1) β (i) β (i+1) β (i+2) β (i+3) β (i+4) β (i+5)

α (i-5) α (i-4) α (i-3) α (i-2) α (i-1) α (i) α (i+1) α (i+2) α (i+3) α (i+4) α (i+5)

$\varepsilon > th_\varepsilon$

MAGNETIZATION STATE (TRACK #(n-1))

MAGNETIZATION STATE (TRACK #n)

RECORDING RADIO WAVEFORM (TRACK #n)

WRITE DATA SIGNAL (TRACK #n)

BOOST CONTROL SIGNAL (TRACK #n)

MAGNETIC DISK DEVICE AND METHOD

CROSS-REFERENCE TO RELATED APPLICATIONS

This application is based upon and claims the benefit of priority from Japanese Patent Application No. 2024-221846, filed on Dec. 18, 2024; the entire contents of which are incorporated herein by reference.

FIELD

Embodiments described herein relate generally to a magnetic disk device and a method.

BACKGROUND

In recent years, the shingled magnetic recording (SMR) method is becoming the mainstream as a write method of magnetic disk devices. In the SMR method, the track width is narrower than that in a conventional magnetic recording (CMR) method. Therefore, in the SMR method, the influence on the recording quality of data on a track adjacent to the write destination track in a write operation is greater as compared with that in the CMR method.

BRIEF DESCRIPTION OF THE DRAWINGS

FIG. 4 is a diagram illustrating an example of a detailed configuration of an RWC and a preamplifier according to the embodiment.

FIG. 11 is a diagram illustrating a detailed configuration of a processing circuit according to a first modification.

FIG. 12 is a diagram illustrating an example of the waveform of a boost and shrink control signal according to the first modification.

FIG. 14 is another diagram for describing an example in which two bit positions adjacent to each other in the radial direction are shifted in the circumferential direction in the second modification.

DETAILED DESCRIPTION

According to the present embodiment, a magnetic disk device includes a magnetic disk, a magnetic head, and a processing circuit. The magnetic disk includes a plurality of tracks. The magnetic head writes data to and reads data from the magnetic disk. The processing circuit modulates a recording width in a radial direction of a first data sequence depending on a first combination and a second combination when writing data to a first track among the plurality of tracks by the magnetic head. The first track is adjacent to a second track in which data is already written among the plurality of tracks. The first combination is a combination of the first data sequence that is data written to the first track and a second data sequence that is data already written to the second track. The second combination is a combination of polarities at the bit position of the first track and the bit position of the second track adjacent to each other in the radial direction.

Hereinafter, a magnetic disk device and a method according to embodiments will be described in detail with reference to the accompanying drawings. Note that the present invention is not limited by the embodiments.

EMBODIMENTS

Figure 1:
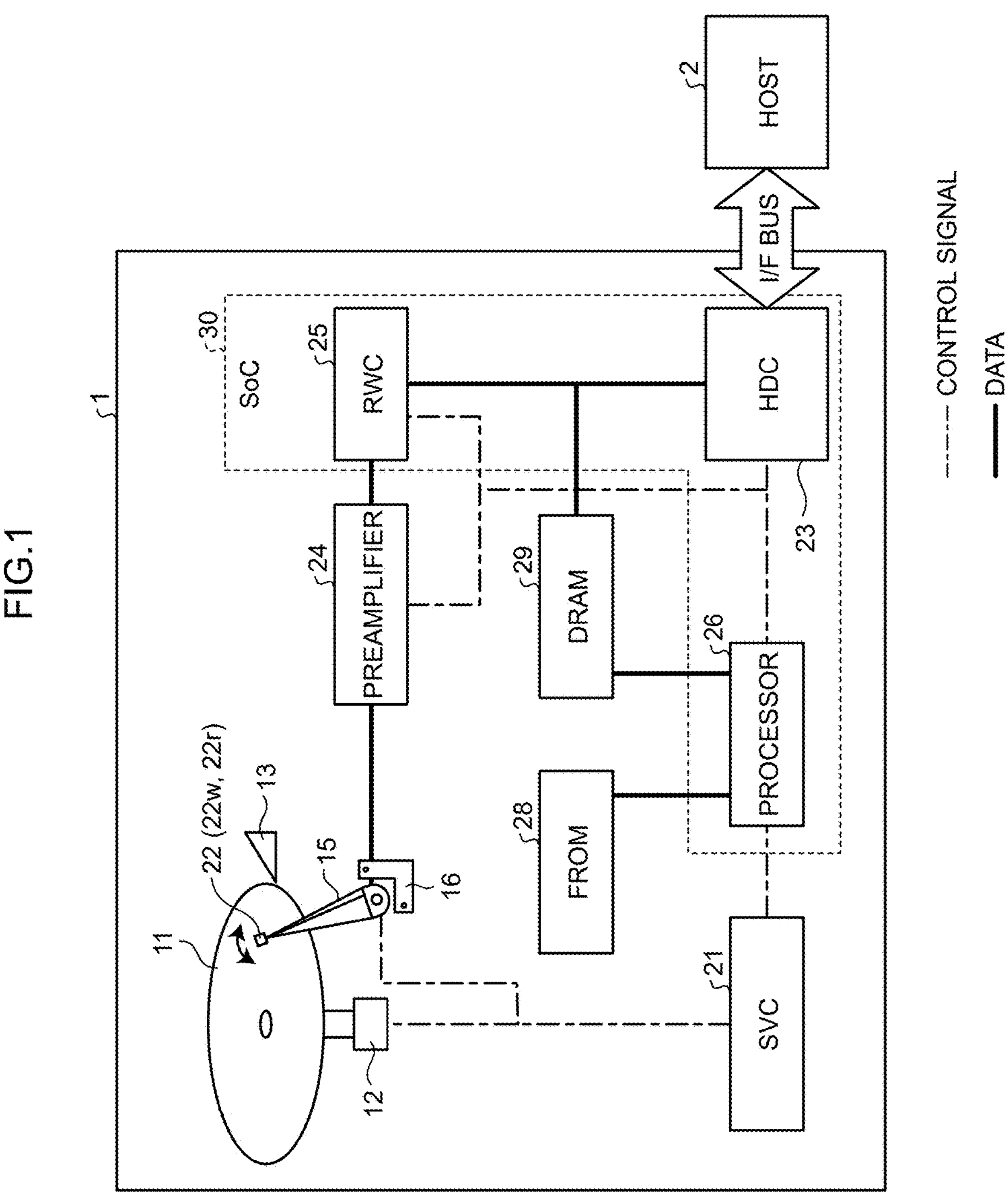
FIG. 1 is a diagram illustrating an exemplary configuration of a magnetic disk device according to a first embodiment.

FIG. 1 is a diagram illustrating an exemplary configuration of a magnetic disk device 1 according to a first embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 accesses the magnetic disk 11 in response to the access command. The access includes writing of data and reading of data. Note that although the magnetic disk device 1 can include a plurality of magnetic disks 11, in the first embodiment, the magnetic disk device 1 includes one magnetic disk 11 for the sake of simplicity of description and illustration.

Data is written and read via a magnetic head 22. Specifically, in addition to the magnetic disk 11, the magnetic disk device 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read and write channel (RWC) 25, a processor 26, a flash read only memory (FROM) 28, and a dynamic random access memory (DRAM) 29.

The magnetic disk 11 is rotated at a predetermined rotation speed by the SPM 12 attached coaxially.

The SVC 21 is an integrated circuit having a function as a driver that drives the SPM 12 and the VCM 16. The processor 26 controls the rotation of the SPM 12 and the rotation of the VCM 16 via the SVC 21.

The magnetic head 22 includes a write element 22*w* and a read element 22*r*. The magnetic head 22 writes data to the magnetic disk 11 by the write element 22*w*. The magnetic head 22 reads data from the magnetic disk 11 by the read element 22*r*. The magnetic head 22 is attached to the tip of the actuator arm 15. The magnetic head 22 is moved in the radial direction of the magnetic disk 11 by the VCM 16 driven by the SVC 21. Note that, as for the write element 22*w* and the read element 22*r* included in the magnetic head 22, a single magnetic head 22 may include a plurality of write elements 22*w* and/or read elements 22*r*.

In such cases where the rotation of the magnetic disk 11 is stopped, the magnetic head 22 is moved to the ramp 13. The ramp 13 holds the magnetic head 22 at a position away from the magnetic disk 11.

The preamplifier 24 is an integrated circuit that writes and reads data via the magnetic head 22. The preamplifier 24 amplifies and outputs a signal read from the magnetic disk 11 by the magnetic head 22 at the time of a read operation and supplies the signal to the RWC 25. In addition, the preamplifier 24 amplifies a signal corresponding to data to be written that is supplied from the RWC 25 and supplies the signal to the magnetic head 22 at the time of a write operation.

The DRAM 29 is used as a buffer for data transferred to and from the host 2. For example, the DRAM 29 is used to temporarily store data to be written or data read from the magnetic disk 11.

The DRAM 29 is used as an operation memory by the processor 26. The DRAM 29 is used as a region in which a firmware program is loaded and a region in which various types of management data are temporarily stored.

The HDC 23 executes control of data transfer with the host 2 via an I/F bus. The HDC 23 supplies data to be written and is received from the host 2 to the RWC 25 via the DRAM 29. The HDC 23 receives read data output from the RWC 25 via the DRAM 29 and transmits the read data to the host 2.

The RWC 25 modulates data to be written that is supplied from the HDC 23 and supplies the data to the preamplifier 24. The RWC 25 also performs demodulation including error correction on a signal read from the magnetic disk 11 and supplied from the preamplifier 24 and then outputs the signal to the HDC 23 as digital data.

The processor 26 is, for example, a central processing unit (CPU). The processor 26 is connected with the FROM 28 and the DRAM 29.

The FROM 28 stores the firmware program, various types of setting information, and others. Note that the firmware program may be stored on the magnetic disk 11.

The processor 26 performs overall control of the magnetic disk device 1 in accordance with the firmware program stored in the FROM 28 or the magnetic disk 11. For example, the processor 26 loads the firmware program from the FROM 28 or the magnetic disk 11 to the DRAM 29 and executes control of the SVC 21, the preamplifier 24, the RWC 25, the HDC 23, and the like in accordance with the firmware program loaded to the DRAM 29.

Note that some or all of the functions of the processor 26 may be implemented by a hardware circuit such as a field-programmable gate array (FPGA) or an application specific integrated circuit (ASIC).

The HDC 23, the RWC 25, and the processor 26 are configured as a system-on-a-chip (SoC) 30. The SoC 30 is an example of a controller. In addition to these, the SoC 30 may include other elements (such as the FROM 28 or the DRAM 29).

Figure 2:
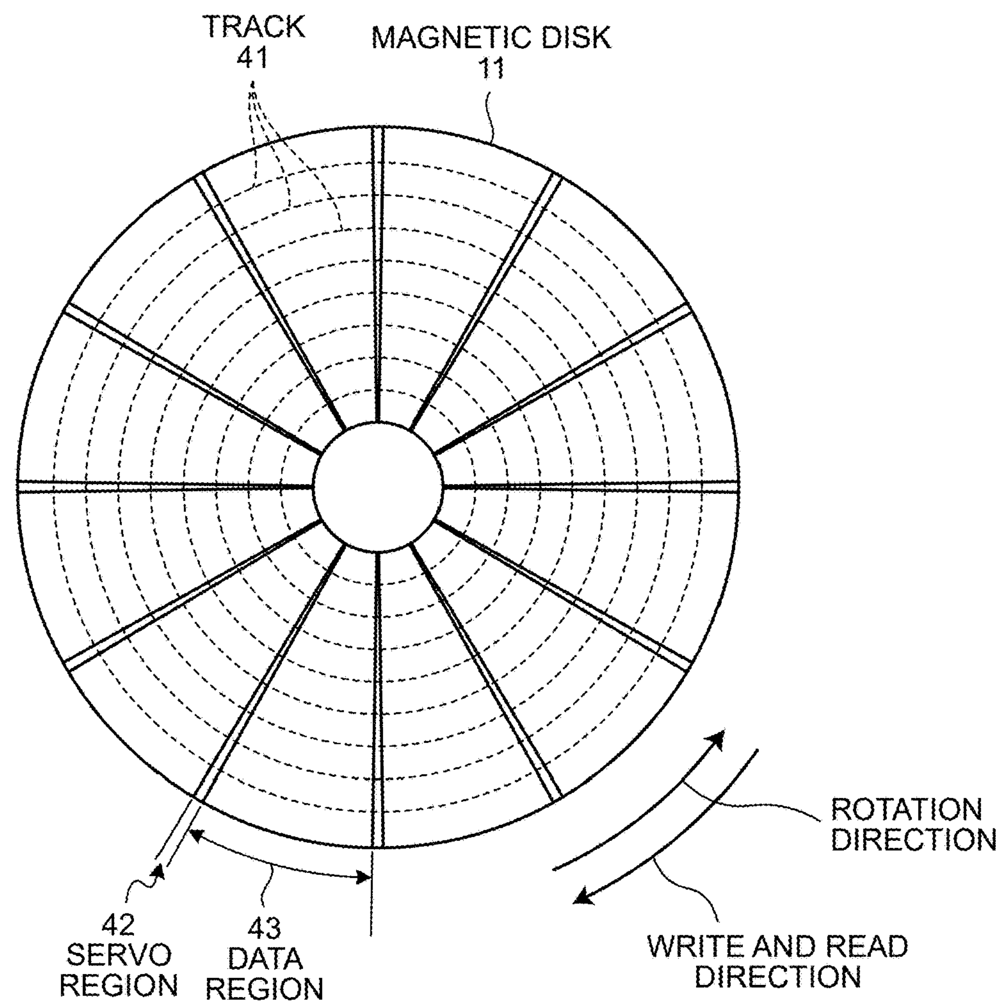
FIG. 2 is a schematic diagram illustrating an exemplary configuration of a magnetic disk according to the first embodiment.

FIG. 2 is a schematic diagram illustrating an exemplary configuration of the magnetic disk 11 according to the first embodiment. Illustrated in this drawing is an example of the rotation direction of the magnetic disk 11. The magnetic head 22 moves relative to the magnetic disk 11 by the rotation of the magnetic disk 11. Therefore, a write and read direction, namely, a direction in which data is written or read by the magnetic head 22 in the circumferential direction is opposite to the rotation direction of the magnetic disk 11.

Servo information is written to the magnetic disk 11 by, for example, a servo writer or self-servo write (SSW) in the manufacturing process. Illustrated in FIG. 2 are servo regions 42 radially arranged as an example of arrangement of servo regions in which the servo information is written. Data regions 43 in which data can be written are included between the servo regions 42.

A plurality of concentric tracks 41 is set in the radial direction of the magnetic disk 11.

The servo information includes a servo mark, a gray code, a burst pattern, and a post code. When writing data to a sector or reading data from a sector, the SoC 30 generates a positional error signal (PES) on the basis of servo information read from a servo region 42 by the magnetic head 22. The PES represents an amount of deviation in the radial direction from the center of a target track. The SoC 30 executes positioning of the magnetic head 22, namely, seek control and tracking control on the basis of a PES acquired each time the magnetic head 22 passes through a servo region 42. For example, before the start of a write operation, the SoC 30 executes seek control to move the magnetic head 22 to a write target track 41. Then, tracking control of maintaining the magnetic head 22 on the write target track 41 is executed during a period from immediately before the start of the write operation to the end of the write operation.

A plurality of sectors in which data is written is arranged in the plurality of data regions 43 arranged along the tracks 41.

Note that a plurality of servo tracks different from the plurality of tracks 41 may be defined by the servo information. In such a case, a correspondence relationship between the plurality of tracks 41 and the plurality of servo tracks is generated at the time of manufacturing or the like and is stored in a predetermined non-volatile storage area (for example, the FROM 28 or the magnetic disk 11). Then, the SoC 30 performs positioning control (seek control and tracking control) of the magnetic head 22 on the basis of the servo information read by the magnetic head 22 and the correspondence relationship.

As a method for writing data to a magnetic disk, a method called SMR and a method called CMR are known. In the first embodiment, the SoC 30 writes data requested to be written from the host 2 to the magnetic disk 11 by the SMR method.

Figure 3:
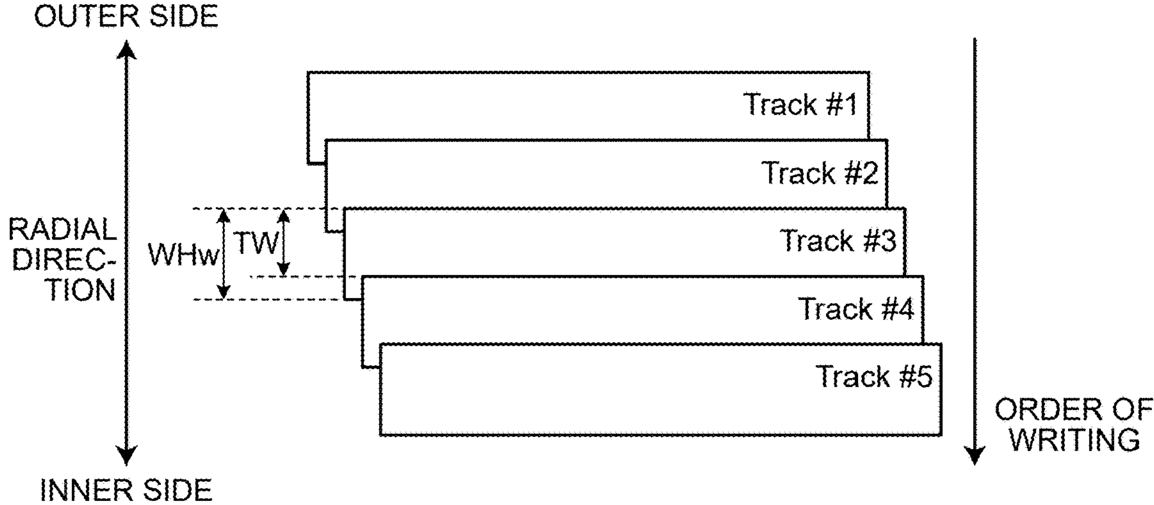
FIG. 3 is a schematic diagram for explaining the SMR method used in the magnetic disk device according to the first embodiment.

FIG. 3 is a schematic diagram for explaining the SMR method used in the magnetic disk device 1 according to the first embodiment. In the SMR method, in a case where writing of data (referred to as first data) of a certain track 41 is executed and then writing of data of a track 41 radially adjacent to the track 41 (referred to as second data) is executed, the tracks 41 are arranged such that the second data overlaps a part of the first data. That is, according to the SMR method, data of one track 41 out of the two tracks 41 adjacent to each other in the radial direction of the magnetic disk 11 is written in a superimposed manner on a part of data of the other track 41 of the two tracks 41.

For example, data of track #2 is written in such a manner as to overlap with a part of data of track #1 that has already been written. Likewise, data of track #3 is written in such a manner as to overlap with a part of data of track #2 that has already been written. That is, according to the SMR method, data of one track 41 overlaps with a part of data of an adjacent track that has already been written, which is repeated. As a result, each track width TW is made narrower than the width (WHw) of the write element 22*w*, whereby the recording density is enhanced.

However, according to the SMR method, since the track width TW is narrower than the width WHw of the write element 22*w*, updating a part of data of the plurality of tracks 41 results in destroying data of a track adjacent to a track of the updated data. In order to prevent data destruction, data of a plurality of tracks including the part of data is collectively updated. A region of the plurality of tracks which is collectively updated is referred to as a band region.

According to the SMR method, it is also specified that writing can be executed on a plurality of tracks 41 in one band region only from predetermined one of an outer side end or an inner side end of the magnetic disk toward the other predetermined end. In the example illustrated in FIG. 3, writing is executed track 41 by track 41 from the outer side end toward the inner side end. The SoC 30 may execute writing for each track 41 from the inner side end toward the outer side end. Alternatively, the order of writing may be set separately for each band region.

In the following description, it is based on the premise that track numbers corresponding to the arrangement order in the radial direction are given to tracks 41 included in a band region and that writing is executed track 41 by track 41 in the order of track numbers in the SMR method.

Note that, in the CMR method, data of two tracks 41 adjacent to each other in the radial direction of the magnetic disk 11 is written in such a manner as not to overlap each other. According to the CMR method, since the width of each of the tracks 41 is greater than or equal to the width (WHw) of the write element 22*w*, data at a desired position can be updated.

When data is written to one track 50 (referred to as a write target track), the magnetic field of the magnetic head 22 may interfere with data that is already written to a track 50 (referred to as an adjacent track) adjacent to the write target track. Due to the interference of the magnetic field, the recording quality of the data of the adjacent track may be deteriorated. Such interference given to the data of the adjacent track by the write operation is known as ATI.

According to the SMR method, the influence of ATI is greater than that in the CMR method. Therefore, in the SMR method, it is desirable to control a recording current, namely, a current to be supplied to the write element 22*w*, in consideration of the recording quality of the data of not only the write target track but also the adjacent track at the time of a write operation.

According to the embodiment, in order to increase both the recording quality of the data of the write target track and the recording quality of the data of the adjacent track in a well-balanced manner, the magnetic disk device 1 operates as follows. The magnetic disk device 1 modulates the recording current on the basis of a combination of a data sequence written to the write target track and a data sequence already written to the adjacent track and a combination of polarities at the bit position of the write target track and the bit position of the adjacent track adjacent in the radial direction. To modulate the recording current is to increase the amplitude of the recording current from the original value or to decrease the amplitude of the recording current from the original value. The original value refers to the value of the amplitude of the recording current determined on the basis of only the data of the write target track.

In order to enable modulation based on these combinations, the magnetic disk device 1 has a configuration described below.

FIG. 4 is a diagram illustrating an example of a detailed configuration of the RWC 25 and the preamplifier 24 according to the embodiment. Note that the RWC 25 and the preamplifier 24 are an example of the processing circuit.

The RWC 25 includes a media write data generating circuit 251, a control signal generating circuit 252, a first driver 253, a second driver 254, and a third driver 255. The preamplifier 24 includes a modulation circuit 241, a fourth driver 242, a fifth driver 243, and a sixth driver 244.

The media write data generating circuit 251 performs various types of modulation including error correction coding on data to be written that is supplied from the HDC 23, thereby generating data to be written to the magnetic disk 11. Hereinafter, the term of write data means data to be written to the magnetic disk 11, the data generated by the media write data generating circuit 251.

The write data generated by the media write data generating circuit 251 is transferred to the preamplifier 24 via the first driver 253 as a binary differential signal. The signal of the write data transferred to the preamplifier 24 is referred to as a write data signal.

Write data of the current write target track is stored in a predetermined storage area in order to enable later reference to the write data of the current write target track as write data of an adjacent track. In the example illustrated in FIG. 4, the write data of the current write target track generated by the media write data generating circuit 251 is transferred to the DRAM 29 and stored in the DRAM 29 for one track 41.

Note that, in the description of FIG. 4 and subsequent drawings, track #n denotes to the write target track, and track #(n−1) denotes an adjacent track.

The media write data generating circuit 251 transfers the write data of track #n not only to the first driver 253 or the DRAM 29 but also to the control signal generating circuit 252.

The control signal generating circuit 252 receives the write data of track #n from the media write data generating circuit 251 and acquires the write data of track #(n−1) from the DRAM 29. The control signal generating circuit 252 determines, between the write data of track #n and the write data of track #(n−1), whether or not the combination of respective data sequences corresponds to a specific combination and whether or not the combination of polarities at the bit positions of the respective tracks 41 corresponds to a specific combination. Then, the control signal generating circuit 252 generates a boost control signal and a shrink control signal on the basis of the determination results. The boost control signal instructs whether or not to increase the amplitude of the recording current. The shrink control signal instructs whether or not to reduce the amplitude of the recording current.

In the example illustrated in FIG. 4, both the boost control signal and the shrink control signal are transferred as binary differential signals. The boost control signal is transferred to the preamplifier 24 via the second driver 254. The shrink control signal is transferred to the preamplifier 24 via the third driver 255.

In the preamplifier 24, the fifth driver 243 receives the boost control signal. The sixth driver 244 receives the shrink control signal.

The boost control signal received by the fifth driver 243 and the shrink control signal received by the sixth driver 244 are transferred to the modulation circuit 241. The modulation circuit 241 controls the fourth driver 242 on the basis of the boost control signal and the shrink control signal.

The fourth driver 242 receives the write data signal transferred from the RWC 25. The fourth driver 242 generates the waveform of the recording current supplied to the write element 22*w* on the basis of the write data signal. At this point, the fourth driver 242 modulates the recording current under the control by the modulation circuit 241.

Figure 5:
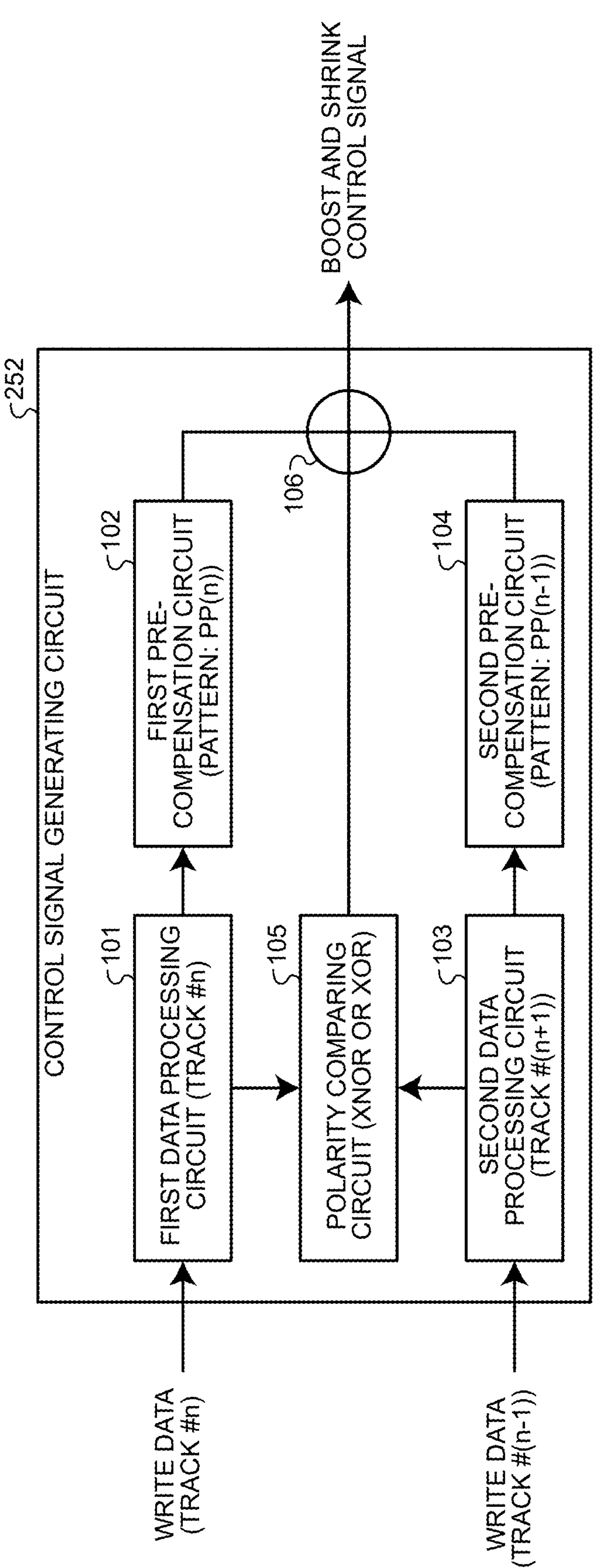
FIG. 5 is a diagram illustrating an example of a detailed configuration of a control signal generating circuit according to the embodiment.

FIG. 5 is a diagram illustrating an example of a detailed configuration of the control signal generating circuit 252 according to the embodiment.

The control signal generating circuit 252 includes a first data processing circuit 101, a first pre-compensation circuit 102, a second data processing circuit 103, a second pre-compensation circuit 104, a polarity comparing circuit 105, and an AND circuit 106.

Note that the control signal generating circuit 252 includes the polarity comparing circuit 105 and the AND circuit 106 for each of the boost control signal and the shrink control signal in order to generate the boost control signal and the shrink control signal. In this example, in order to prevent the drawing from becoming complicated, it is described that one polarity comparing circuit 105 and one AND circuit 106 are included in the control signal generating circuit 252.

The write data of track #n is input to the first data processing circuit 101. The write data of track #(n−1) is input to the second data processing circuit 103. Write data is synchronously input to the first data processing circuit 101 and the second data processing circuit 103 bit by bit in order from the head of each piece of write data. Input of the write data of track #n to the first data processing circuit 101 and input of the write data of track #(n−1) to the second data processing circuit 103 are synchronized in such a manner that, when a bit included in the write data of track #n of a pair of bits whose write positions are adjacent to each other in the radial direction is input to the first data processing circuit 101, a bit included in the write data of track #(n−1) of the pair of bits is input to the second data processing circuit 103.

The first data processing circuit 101 sequentially transfers the write data of track #n to the polarity comparing circuit 105 bit by bit. The second data processing circuit 103 sequentially transfers the write data of track #(n−1) to the polarity comparing circuit 105 bit by bit.

The polarity comparing circuit 105 compares the polarity at the write position between the write data of track #n and the write data of track #(n−1) and outputs the comparison result as a binary signal. The polarity comparing circuit 105 compares the polarity at the write position of the one bit of track #n with the polarity at the write position of the one bit of track #(n−1) for each pair of bits whose write positions are adjacent to each other in the radial direction.

The write data is written to the magnetic disk 11 as a binary signal. In the magnetic disk 11, an area (an example of the bit position) corresponding to one bit on the recording surface of the magnetic disk 11 is magnetized to a polarity corresponding to the level of the binary signal of the positive polarity or the negative polarity, whereby 1-bit data is recorded in the area. That is, the level of the binary signal of the write data corresponds to the polarity of magnetization of the magnetic disk 11. The polarity comparing circuit 105 determines whether the pair of polarities at bit positions adjacent to each other in the radial direction are of the same polarity or of different polarities by a logical operation using the value of the write data of track #n and the value of the write data of track #(n−1).

A bit included in the write data of track #n of the pair of bits whose write positions are adjacent to each other in the radial direction is referred to as a write target bit, and a bit included in the write data of track #(n−1) of the pair of bits is referred to as an adjacent bit. Furthermore, a pair of bits whose write positions are adjacent to each other in the radial direction is simply referred to as a bit pair.

The correspondence relationship between the level and the value of the binary signal can be desirably determined by the designer. Hereinafter, when a binary signal is described, an "H" level of the binary signal corresponds to a value "1", and a binary signal "L" level corresponds to a value "0".

A method of outputting the determination result by the polarity comparing circuit 105 varies depending on a control signal to be generated.

The polarity comparing circuit 105 for generating the boost control signal sets the output signal to the "H" level in a case where the pair of polarities at bit positions where a bit pair is written is of the same polarity and outputs an output signal of the "L" level in a case where the pair of polarities at the bit positions is of different polarities. That is, the polarity comparing circuit 105 performs a logical operation of exclusive OR (XNOR) on the bit pair.

The polarity comparing circuit 105 for generating the shrink control signal sets the output signal to the "L" level in a case where the pair of polarities at bit positions where a bit pair is written is of the same polarity and outputs an output signal of the "H" level in a case where the pair of polarities at the bit positions is of different polarities. That is, the polarity comparing circuit 105 performs a logical operation of exclusive OR (XOR) on the bit pair.

The first data processing circuit 101 sequentially performs non-return-to-zero inversion (NRZI) encoding on the write data of track #n. The write data of track #n that is NRZI-encoded by the first data processing circuit 101 is sequentially input to the first pre-compensation circuit 102.

The second data processing circuit 103 sequentially performs NRZI encoding on the write data of track #(n−1). The write data of track #(n−1) that is NRZI-encoded by the second data processing circuit 103 is sequentially input to the second pre-compensation circuit 104.

Note that, in the NRZI code, "O" indicates that the value of the write data (in other words, the polarity of magnetization) is maintained without being inverted, and "1" indicates that the value of the write data (in other words, the polarity of magnetization) is inverted. NRZI-encoded write data is referred to as an NRZI label.

Every time one character of an NRZI label of track #n is input, the first pre-compensation circuit 102 compares the NRZI label of track #n with the pattern PP (n) having a preset fixed length. The first pre-compensation circuit 102 outputs the comparison result as a binary signal. An interval compared with the pattern PP (n) in the NRZI label of track #(n−1) (hereinafter, referred to as a comparison section) is a range of a fixed length including the position of the write target bit being processed by the polarity comparing circuit 105. In a case where the NRZI label of the comparison section coincides with the pattern PP(n), the first pre-compensation circuit 102 sets the output signal to the "H" level. In a case where the NRZI label of the comparison section does not match the pattern PP(n), the first pre-compensation circuit 102 sets the output signal to the "L" level.

Every time one symbol of the NRZI label of track #(n−1) is input, the second pre-compensation circuit 104 compares the NRZI label of track #(n−1) with a pattern PP(n−1) having a preset fixed length. The second pre-compensation circuit 104 outputs the comparison result as a binary signal. As for the NRZI label of track #(n−1), similarly to the first pre-compensation circuit 102, a section having a fixed length, the section including the position of the adjacent bit that is being processed by the polarity comparing circuit 105, is set as the comparison section. In a case where the NRZI label of the comparison section coincides with the pattern PP(n−1), the second pre-compensation circuit 104 sets the output signal to the "H" level. In a case where the NRZI label of the comparison section does not match the pattern PP(n−1), the second pre-compensation circuit 104 sets the output signal to the "L" level.

Note that each of the first pre-compensation circuit 102 and the second pre-compensation circuit 104 has a register. The pattern PP(n) is set in the register of the first pre-compensation circuit 102, and the pattern PP(n−1) is set in the register of the second pre-compensation circuit 104. The first pre-compensation circuit 102 compares the NRZI label in the comparison section of track #n with the pattern PP(n) set in the register. The second pre-compensation circuit 104 compares the NRZI label in the comparison section of track #(n−1) with the pattern PP(n−1) set in the register. The timing of setting the pattern PP to each register may be any timing. In addition, components for setting the pattern PP to each register are not limited to specific components. For example, the processor 26 may set each pattern PP in the register for each track 41 that is a write destination. Which pattern is used as the pattern PP may be set as desired. In the manufacturing process, the designer can determine the pattern PP to be set in each register such that the recording quality of each piece of data of a write target track and an adjacent track is high. The processor 26 sets the pattern PP determined by the designer. The processor 26 may be configured to modify the pattern PP set to each register depending on a radial position on the magnetic disk 11, the magnetic head 22, a set recording density, or others. An example of each pattern PP will be described later.

The AND circuit 106 performs a logical operation of a logical product on the output signal from the first pre-compensation circuit 102, the output signal from the second pre-compensation circuit 104, and the output signal from the polarity comparing circuit 105. The AND circuit 106 outputs the result of the logical operation as a binary signal. The output signal from the AND circuit 106 is a boost control signal or a shrink control signal.

Next, an example of modulation of the recording current by the RWC 25 and the preamplifier 24 configured as described above will be described.

Figure 6:
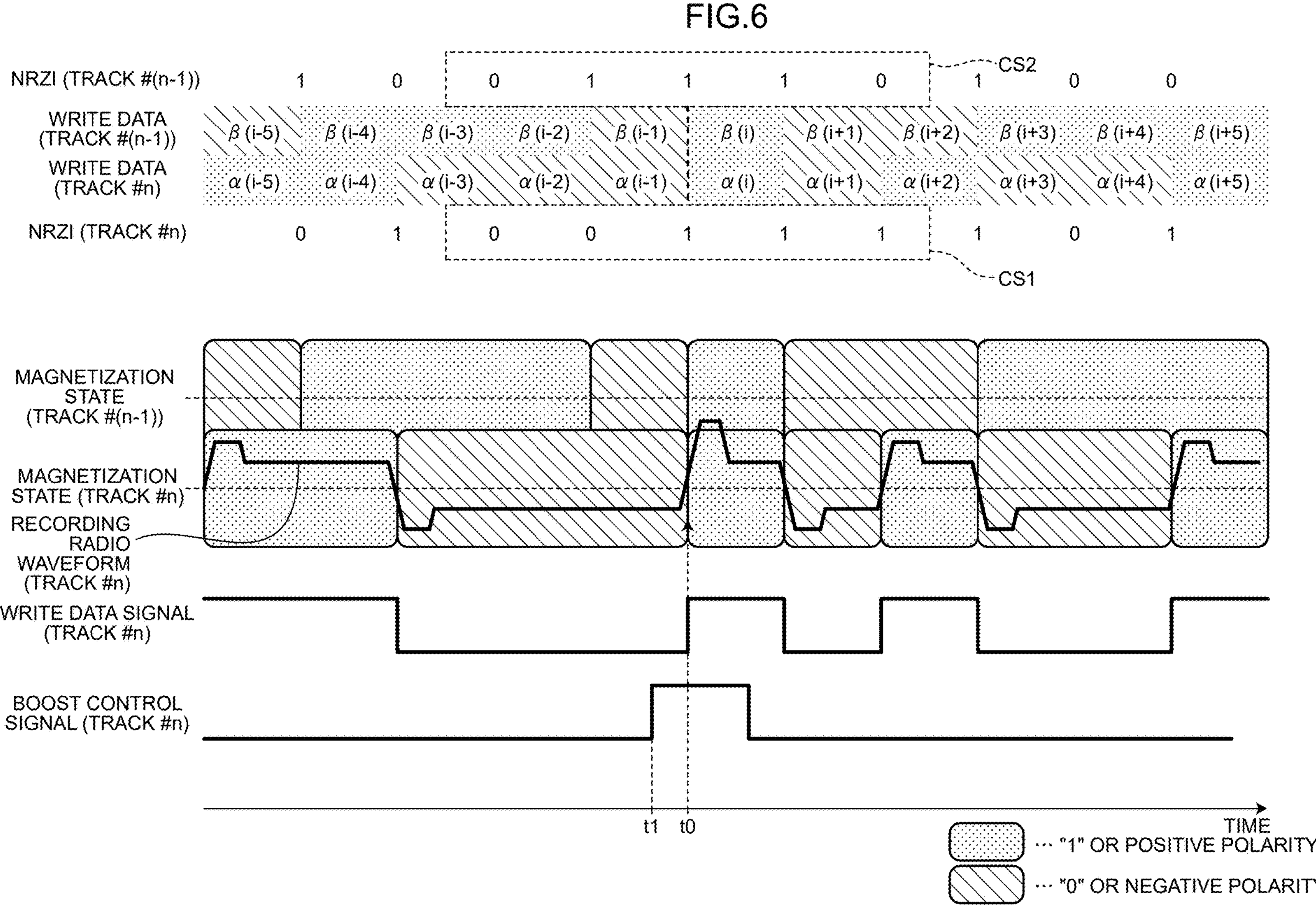
FIG. 6 is a diagram illustrating an example of modulation for increasing the amplitude of a recording current in the magnetic disk device according to the embodiment.

FIG. 6 is a diagram illustrating an example of modulation for increasing the amplitude of the recording current in the magnetic disk device 1 according to the embodiment.

In FIG. 6, a sequence of α represents the data sequence of the write data of track #n. A sequence of β represents the data sequence of the write data of track #(n−1). Where x denotes a natural number greater than or equal to 0, an x-th bit from the head of the write data of track #n is denoted as α(x), and an x-th bit from the head of the write data of track #(n−1) is denoted as β(x).

Note that each of these pieces of write data is data for one sector. It is based on a premise that a sector in which the write data of track #n is written and a sector in which the write data of track #(n−1) is written are adjacent to each other in the radial direction. Therefore, the position where α(x) is written and the position where β(x) is written are adjacent to each other in the radial direction.

The symbol x indicates the position of a bit in the write data. The symbol x can also be deemed to correspond to the order or time of writing to the magnetic disk 11.

In the sequence of α and the sequence of β, the value of a bit applied with dot hatching is "1", and the value of a bit applied with diagonal hatching is "0". As described above, the magnetic disk 11 is magnetized to one of the positive polarity or the negative polarity that corresponds to the value of data. In one example, the value "1" corresponds to positive polarity, and the value "0" corresponds to negative polarity. Note that the correspondence relationship between the value and the polarity is not limited thereto.

FIG. 6 illustrates a magnetization state at the time when the sequence of β is written in track #(n−1) and then the sequence of α is written in track #n. Dot hatching indicates magnetization to positive polarity, and oblique hatching indicates magnetization to negative polarity.

A data sequence from α(i−5) to α(i+5) is "11000101001". Therefore, the NRZI label generated by the first data processing circuit 101 from this data sequence is "0100111101".

A data sequence from β(i−5) to β(i+5) is "01110100111". Therefore, the NRZI label generated by the second data processing circuit 103 from this data sequence is "1001110100".

Note that, in the present specification, presentation of each of the data sequence and the NRZI label is indicated in chronological order.

Furthermore, in the example illustrated in FIG. 6, the pair of α(i) and β(i) is deemed as the bit pair being processed by the polarity comparing circuit 105, and a section of the NRZI label, which is generated from a data sequence ranging from a bit three bits before the bit pair to a bit two bits after the bit pair (section SC1 and section SC2 in FIG. 6), is set as a comparison section.

As described above, the pattern PP(n) and the pattern PP(n−1) can be desirably set depending on the design. In this example, it is based on a premise that a pattern indicating that the write target bit and the adjacent bit are data of 1T is set as the pattern PP(n) and the pattern PP(n−1). Note that "T" indicates a length of a bit whose polarity is maintained without being inverted. That is, the write target bit being data of 1T means that the polarity is inverted immediately before the write target bit and that the polarity is inverted immediately after the write target bit in the data sequence. Therefore, "**11*" is set as the pattern PP(n). In addition, the adjacent bit being data of 1T means that the polarity is inverted immediately before the adjacent bit and that the polarity is inverted immediately after the adjacent bit. Therefore, "**11*" is set as the pattern PP(n−1). In the notation of the pattern PP, "*" indicates a wildcard character of one character. That is, "*" may be either "1" or "0".

By writing α(i), the bit position of α(i) is magnetized to positive polarity. The polarity of the bit position where β(i) is written is positive. That is, the pair of polarities at bit positions where α(i) and β (i) are written has the same polarity. Therefore, the polarity comparing circuit 105 outputs "1" as a result of logical operation of XNOR.

The NRZI label in the comparison section SC1 regarding the write data of track #n is "01110". The NRZI label of the comparison section SC1 coincides with "**11*" which is the pattern PP(n). Therefore, the first pre-compensation circuit 102 outputs "1" as the comparison result.

The NRZI label in the comparison section SC2 regarding the write data of track #(n−1) is "00111". The NRZI label of the comparison section SC2 coincides with "**11*" which is the pattern PP(n−1). Therefore, the second pre-compensation circuit 104 outputs "1" as the comparison result.

Regarding α(i), "1" is input to the AND circuit 106 from all of the polarity comparing circuit 105, the first pre-compensation circuit 102, and the second pre-compensation circuit 104. Thus, the AND circuit 106 outputs "1" as the output signal (namely, as the boost control signal).

FIG. 6 illustrates the waveform of a write data signal of track #n, the waveform of a boost control signal transferred in parallel with the write data signal of track #n, and the waveform of a recording current generated on the basis of these signals.

In a case where the boost control signal is "H" at the timing of the edge of the write data signal, the modulation circuit 241 performs control to increase the amplitude of the recording current to be higher than a normal value. In a case where the boost control signal is "L" at the timing of the edge of the write data signal, the modulation circuit 241 does not perform the control to increase the amplitude of the recording current to be higher than a normal value. In order to enable such an operation, the control signal generating circuit 252 makes the transmission timing of the boost control signal slightly earlier than the transmission timing of the write data signal.

In the example illustrated in FIG. 6, the write data signal rises at the start of writing α(i) (timing t0). In order to cause the boost control signal to be already at the "H" level at timing t0, the control signal generating circuit 252 causes the boost control signal to transition from the "L" level to the "H" level at timing t1 that is slightly earlier than timing t0.

At timing immediately after a data value is inverted, the amplitude of the recording current is temporarily increased in order to quickly stabilize the magnetic field of the write element 22*w*. In such a waveform of the recording current, a portion where the amplitude of the recording current is temporarily increased immediately after the data value is inverted is known as an overshoot amplitude (OSA). The amplitude of the recording current is maintained at a constant value in order to maintain the magnetic field until the data value is inverted next after the OSA. The portion where the amplitude of the recording current is maintained at the constant value is referred to as IW. In the embodiment, as an example, modulation of the OSA portion is performed on the basis of the boost control signal.

According to the write data signal, the data value is inverted at α(i−3), α(i), α(i+1), α(i+2), and α(i+5). Therefore, when writing α(i−3), α(i), α(i+1), α(i+2), and α(i+5) is started, the amplitude is increased by the OSA. Among these OSAs, the amplitude of the OSA at the time of writing the data of α(i), in which the amplitude of the recording current is instructed to be increased by the boost control signal, is made larger than the amplitudes of other OSAs.

When modulation for increasing the amplitude of the recording current is performed, the influence of ATI on the adjacent track at the position where the modulation has been performed in the write target track increases. However, modulation for increasing the amplitude of the recording current is performed on the premise that the pair of polarities at bit positions adjacent to each other in the radial direction is of the same polarity. Therefore, the recording quality of the adjacent bit is reinforced by the influence of ATI enhanced at the time of writing the write target bit. That is, the recording quality of the bit written in the adjacent track is improved.

In addition, since the amplitude of the recording current is increased as compared to the normal value at the position where the modulation has been performed in the write target track, the recording quality of the bit written in the write target track is also improved.

That is, the recording quality of data of the write target track and the adjacent track can be improved in a well-balanced manner.

Figure 7:
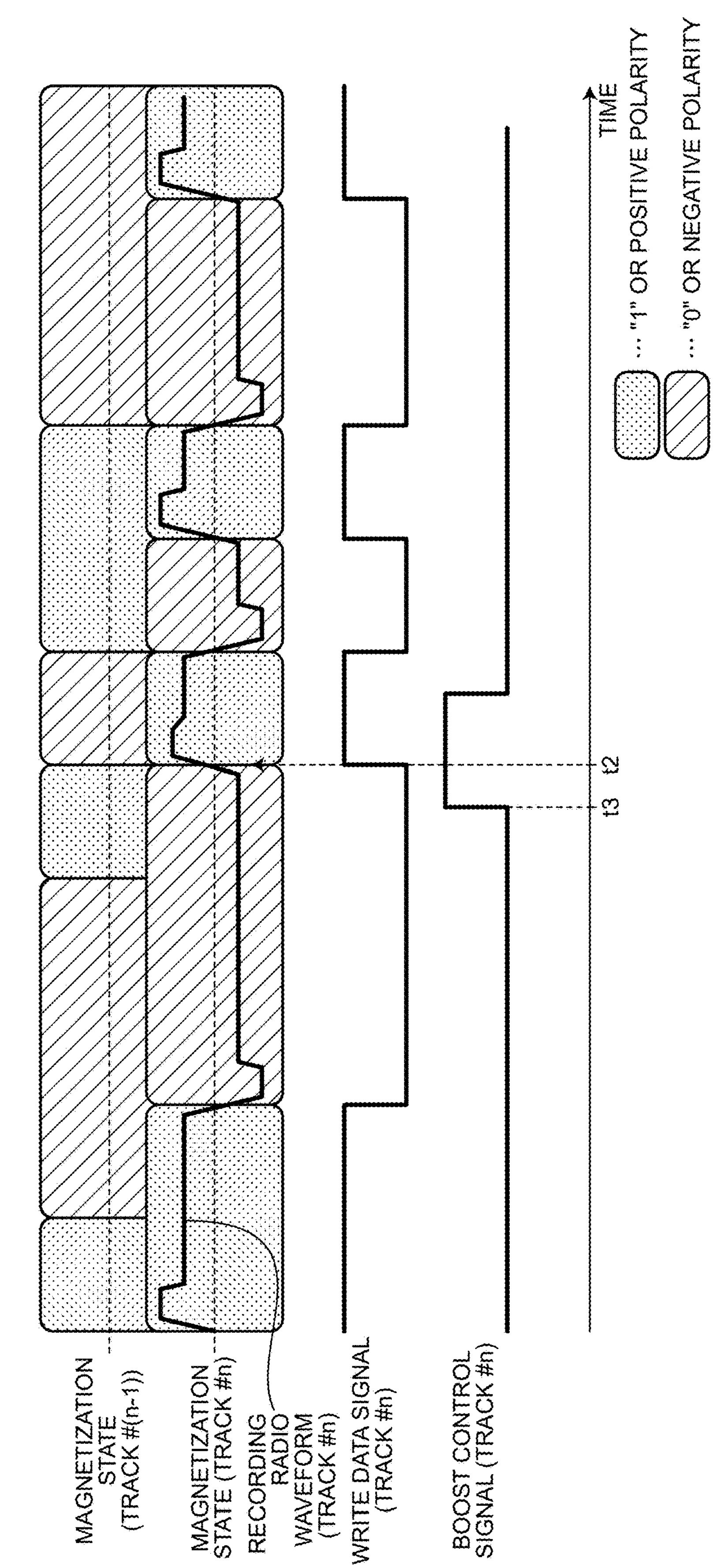
FIG. 7 is a diagram illustrating an example of modulation for reducing the amplitude of the recording current in the magnetic disk device according to the embodiment.

FIG. 7 is a diagram illustrating an example of the modulation for reducing the amplitude of the recording current in the magnetic disk device 1 according to the embodiment.

The example illustrated in FIG. 7 is different from the example illustrated in FIG. 6 in that the values of bits of the write data sequence of track #(n−1) are inverted. Therefore, as in the example illustrated in FIG. 6, at the time of writing α(i), the first pre-compensation circuit 102 outputs "1" as the comparison result, and the second pre-compensation circuit 104 outputs "1" as the comparison result.

By writing α(i), the bit position of α(i) is magnetized to positive polarity. The polarity of the bit position where β(i) is written is negative. That is, the pair of polarities at the bit positions where α(i) and β (i) are written are of different polarities. Therefore, the polarity comparing circuit 105 outputs "1" as a result of logical operation of XOR.

Regarding α(i), "1" is input to the AND circuit 106 from all of the polarity comparing circuit 105, the first pre-compensation circuit 102, and the second pre-compensation circuit 104. Thus, the AND circuit 106 outputs "1" as an output signal (namely, the shrink control signal).

In a case where the shrink control signal is "H" at the timing of the edge of the write data signal, the modulation circuit 241 performs control to decrease the amplitude of the recording current to be smaller than the normal value. In a case where the shrink control signal is "L" at the timing of the edge of the write data signal, the modulation circuit 241 does not perform the control to decrease the amplitude of the recording current to be smaller than the normal value. In order to enable such an operation, the control signal generating circuit 252 makes the transmission timing of the shrink control signal slightly earlier than the transmission timing of the write data signal.

In the example illustrated in FIG. 7, the write data signal rises at the start of writing α(i) (timing t2). In order to cause the shrink control signal to be already at the "H" level at timing t2, the control signal generating circuit 252 causes the shrink control signal to transition from the "L" level to the "H" level at timing t3 that is slightly earlier than timing t2.

In a case where the shrink control signal is "H" at timing t2, the modulation circuit 241 decreases the amplitude of the recording current to be smaller than the normal value. In this example, the modulation circuit 241 makes the amplitude of OSA at the time of writing the data of α(i) smaller than the amplitude of other OSAs.

When the modulation for reducing the amplitude of the recording current is performed, the influence of ATI on the adjacent track at the position where the modulation has been performed in the write target track decreases. The modulation for reducing the amplitude of the recording current is performed on the premise that the bit pair is of different polarities. Therefore, it is possible to prevent the bit value that is already written in the adjacent track from being inverted due to the influence of ATI. That is, it is possible to suppress deterioration of the recording quality of the bit written in the adjacent track.

In a write operation for one track 41, both the modulation for increasing the amplitude of the recording current and the modulation for reducing the amplitude of the recording current may be performed.

Figure 8:
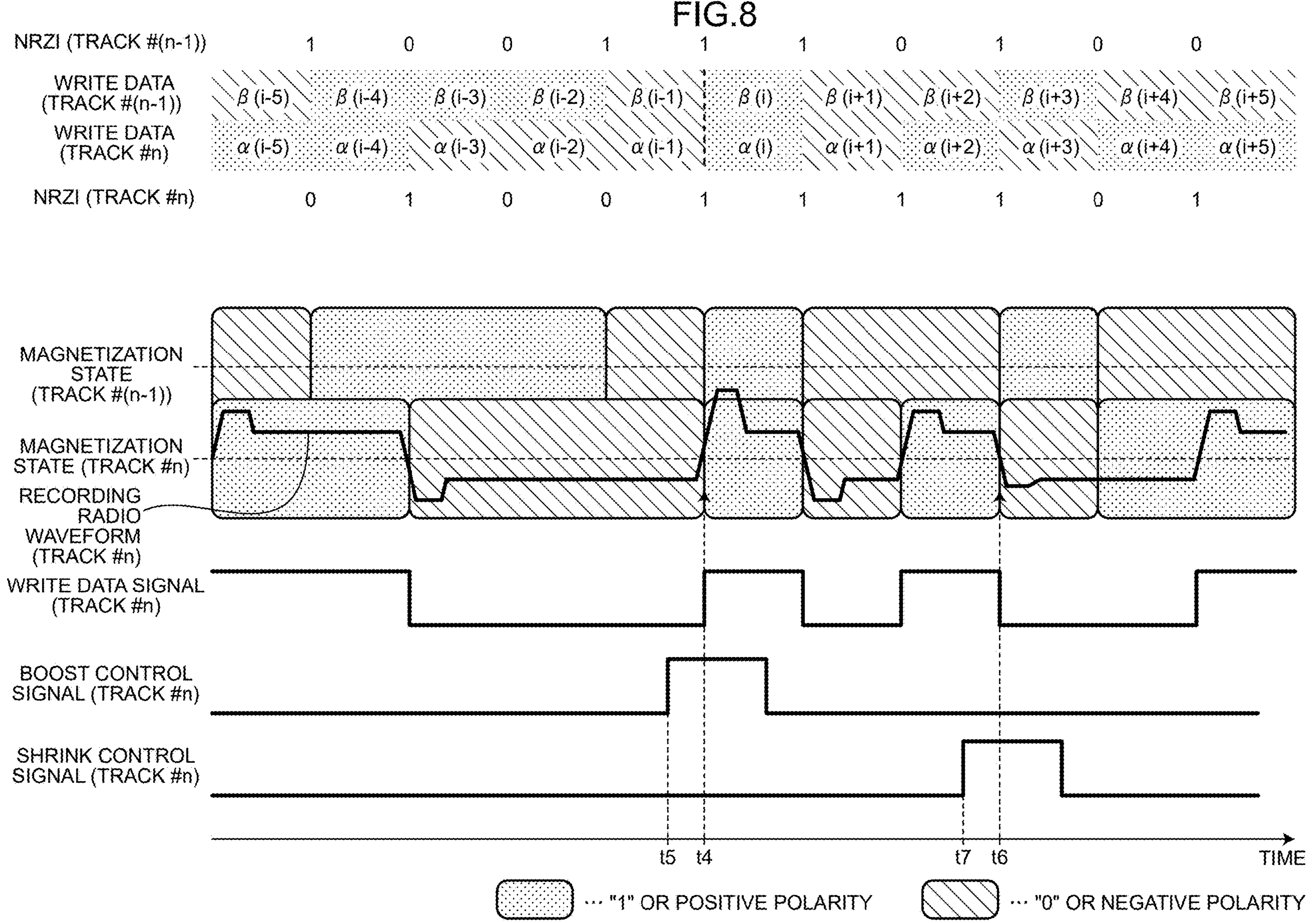
FIG. 8 is a diagram for describing an example in which both modulation for increasing the amplitude of the recording current and modulation for reducing the amplitude of the recording current are performed in the magnetic disk device according to the embodiment.

FIG. 8 is a diagram for describing an example in which both the modulation for increasing the amplitude of the recording current and the modulation for reducing the amplitude of the recording current are performed in the magnetic disk device 1 according to the embodiment. In the example illustrated in the drawing, the boost control signal is caused to transition to the "H" level at timing t5 slightly earlier than timing t4 for writing $\alpha(i)$. Therefore, the amplitude of the OSA portion is increased at the time of writing $\alpha(i)$. In addition, the shrink control signal is caused to transition to the "H" level at timing t5 slightly earlier than timing t7 for writing $\alpha(i+3)$. Therefore, the amplitude of the OSA portion is reduced at the time of writing $\alpha(i+3)$.

Figure 9:
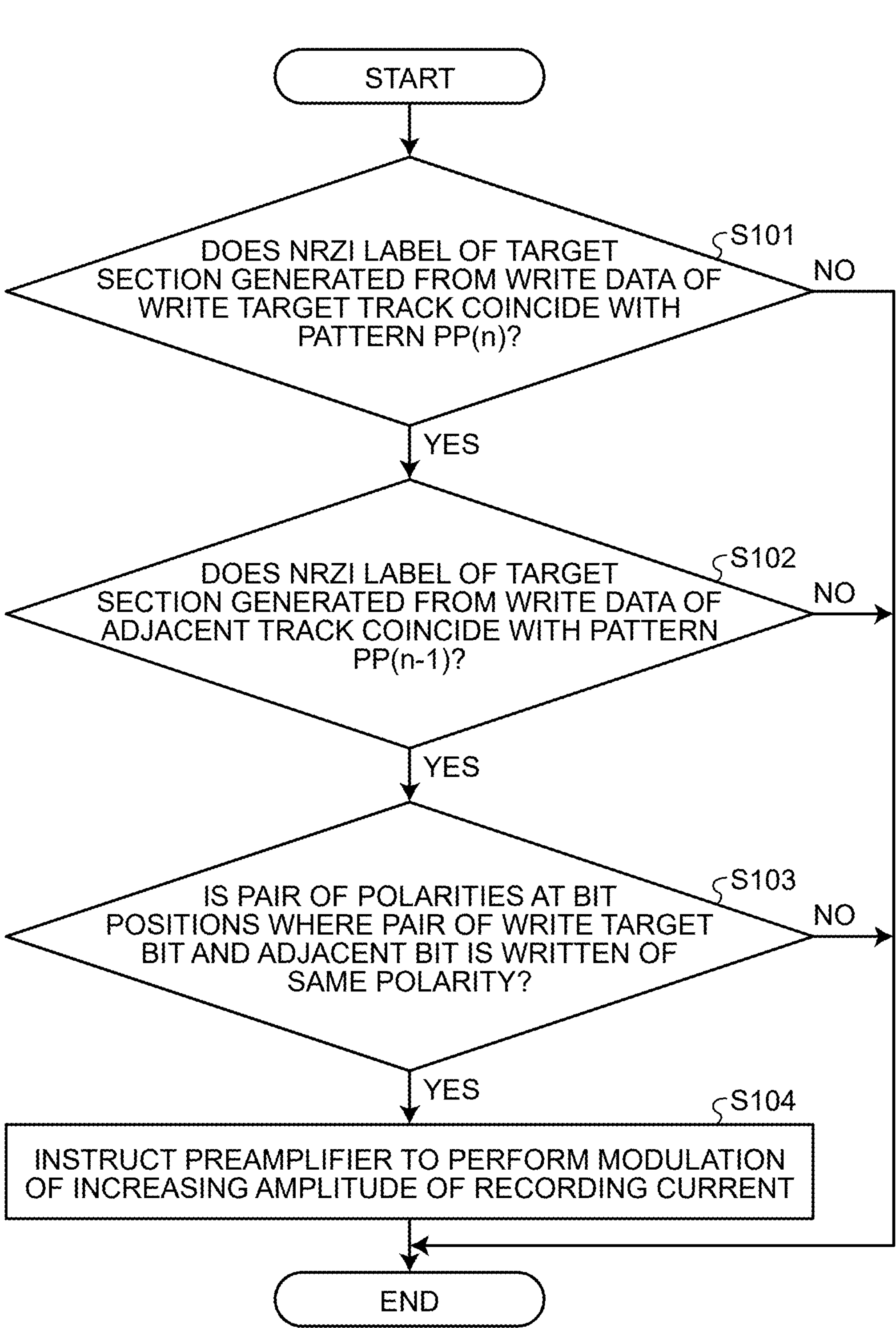
FIG. 9 is a flowchart illustrating an exemplary operation related to modulation for increasing the amplitude of the recording current by the control signal generating circuit according to the embodiment.

FIG. 9 is a flowchart illustrating an exemplary operation related to modulation for increasing the amplitude of the recording current by the control signal generating circuit 252 according to the embodiment. Note that a series of operations illustrated in the drawing is repeatedly executed for write data of a write target track bit by bit. The drawing illustrates an operation performed at the time of writing a certain write target bit.

In the RWC 25, the first pre-compensation circuit 102 determines whether or not the NRZI label of the target section SC1 generated from the write data sequence of the write target track, in other words, track #n, coincides with the pattern PP(n) (S101).

The second pre-compensation circuit 104 determines whether or not the NRZI label of the target section SC2 generated from the write data sequence of the adjacent track, in other words, track #(n−1), coincides with the pattern PP(n−1) (S102).

In addition, the polarity comparing circuit 105 determines whether or not the pair of polarities at the bit positions where the pair of the write target bit and the adjacent bit are written is a pair of the same polarity (S103).

Note that, in this example, these three types of determination are performed in the order of S101, S102, and S103 for convenience; however, in practice, these three types of determination are performed simultaneously or substantially simultaneously.

If the results of all the types of determination of S101, S102, and S103 are affirmative, the AND circuit 106 instructs the preamplifier 24 to perform the modulation for increasing the amplitude of the recording current (S104). Specifically, the boost control signal is caused to transition from the "L" level to the "H" level. Then, the operation ends.

If any of the results of the determination of S101, S102, and S103 is a negative determination, the instruction to perform the modulation for increasing the amplitude of the recording current is not performed. Then, the operation ends.

Figure 10:
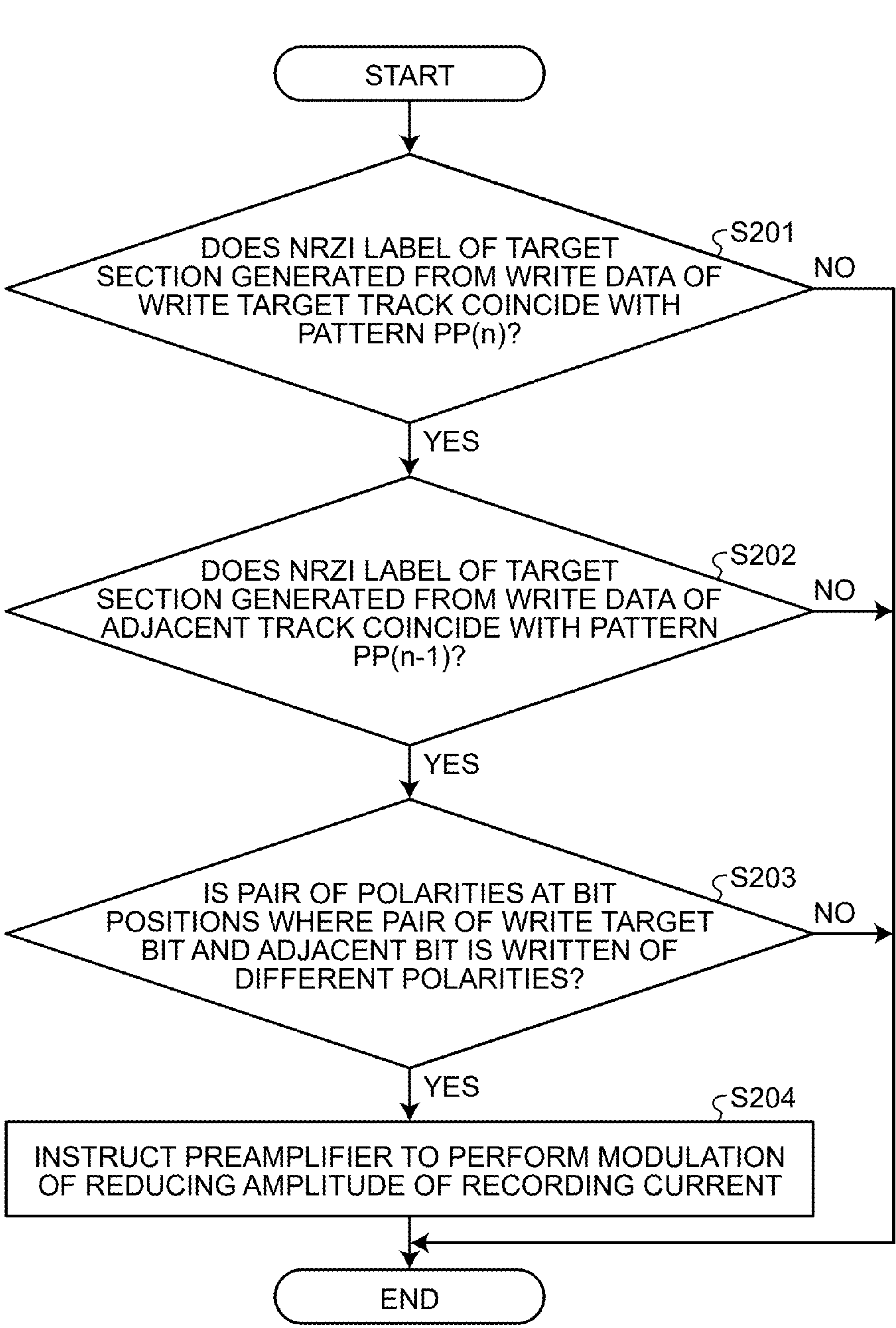
FIG. 10 is a flowchart illustrating an exemplary operation related to modulation for reducing the amplitude of the recording current by the control signal generating circuit according to the embodiment.

FIG. 10 is a flowchart illustrating an exemplary operation related to modulation for reducing the amplitude of the recording current by the control signal generating circuit 252 according to the embodiment; Note that a series of operations illustrated in the drawing is repeatedly executed for write data of a write target track bit by bit. The drawing illustrates an operation performed at the time of writing a certain write target bit.

In the RWC 25, the first pre-compensation circuit 102 determines whether or not the NRZI label of the target section SC1 generated from the write data sequence of the write target track, in other words, track #n, coincides with the pattern PP(n) (S201).

The second pre-compensation circuit 104 determines whether or not the NRZI label of the target section SC2 generated from the write data sequence of the adjacent track, in other words, track #(n−1), coincides with the pattern PP(n−1) (S202).

In addition, the polarity comparing circuit 105 determines whether or not the pair of polarities at the bit positions where the pair of the write target bit and the adjacent bit are written is a pair of different polarities (S203).

Also in FIG. 10, in this example, these three types of determination are performed in the order of S201, S202, and S203 for convenience; however, in practice, these three types of determination are performed simultaneously or substantially simultaneously.

If the results of all the types of determination of S201, S202, and S203 are affirmative, the AND circuit 106 instructs the preamplifier 24 to perform the modulation for reducing the amplitude of the recording current (S204). Specifically, the shrink control signal is caused to transition from the "L" level to the "H" level. Then, the operation ends.

If any of the results of the determination of S201, S202, and S203 is a negative determination, the instruction to perform the modulation for reducing the amplitude of the recording current is not performed. Then, the operation ends.

In the above description, the first pre-compensation circuit 102 and the second pre-compensation circuit 104 each compare the NRZI-encoded write data with the pattern PP to determine whether or not the combination of the write data sequence of the write target track and the write data sequence of the adjacent track corresponds to a specific combination. The first pre-compensation circuit 102 and the second pre-compensation circuit 104 may determine whether or not the combination of the write data sequence of the write target track and the write data sequence of the adjacent track corresponds to a specific combination on the basis of the write data that is not NRZI-encoded or the write data that is desirably encoded without being limited to the NRZI-encoded write data.

Furthermore, as an example of the specific combination, there is a combination in which both the write target bit and the adjacent bit are data of 1T. In general, in the case where data of 1T is written to a magnetic disk, the recording quality of the data tends to be unstable since the width in the circumferential direction in which the data is magnetized to the polarity corresponding to the data is narrow. As in the above example, with the processing circuit performing modulation of the recording current depending on the polarities at the write positions of the bit pair in a case where both the write target bit and the adjacent bit have data of 1T, the recording quality of the data of 1T is improved in both the write target bit and the adjacent bit.

Note that the specific combination is not limited to the example described above. The designer can test various combinations and set any combination as the specific combination on the basis of the test result.

Furthermore, as an example of modulation of the recording current, the amplitude of the OSA portion is modified. The method of modulating the recording current is not limited thereto. The amplitude of the IW portion may be modified in addition to or instead of the OSA portion.

As described above, according to the embodiment, the processing circuit (namely, the RWC 25 and the preamplifier 24) modulates the recording current supplied to the magnetic head 22 depending on the combination of the write data sequence of the write target track and the combination of the polarities at the bit position of the write target track and the bit position of the adjacent track adjacent to each other in the radial direction.

Therefore, the recording quality of not only the data of the write target track but also the data of the adjacent track can be improved. That is, the recording quality is improved.

Furthermore, according to the embodiment, in a case where the combination of the polarities at the bit position of the write target bit and the bit position of the adjacent bit is of the same polarity, the processing circuit increases the amplitude of the recording current at the time of writing the write target bit.

Therefore, the recording quality of data of the write target track and the adjacent track can be improved in a well-balanced manner.

Alternatively, according to the embodiment, in a case where the combination of the polarities at the bit position of the write target bit and the bit position of the adjacent bit is of different polarities, the processing circuit reduces the amplitude of the recording current at the time of writing the write target bit.

Therefore, it is possible to suppress deterioration of the recording quality of the bit written in the adjacent track. That is, the recording quality of the adjacent track is improved.

According to the embodiment, the pattern PP(n) is set in the first pre-compensation circuit 102, and the pattern PP(n−1) is set in the second pre-compensation circuit 104. In a case where the write data sequence of the write target track coincides with the pattern PP(n) and the write data sequence of the adjacent track coincides with the pattern PP(n−1), the processing circuit executes modulation of the recording current depending on the combination of the polarities at the bit position of the write target bit and the bit position of the adjacent bit.

Therefore, the designer can optimize the combination of the write data sequences at the time of performing modulation such that the recording quality of both the write data of the write target track and the write data of the adjacent track is as high as possible.

First Modification

In the embodiment, both the boost control signal and the shrink control signal are configured as binary signals. The configuration of these signals is not limited to the above. As a first modification, an example in which the boost control signal and the shrink control signal are collectively integrated into a ternary control signal will be described.

FIG. 11 is a diagram illustrating a detailed configuration of a processing circuit according to the first modification.

An RWC 25 includes a media write data generating circuit 251, a control signal generating circuit 252*a*, and a seventh driver 256. A preamplifier 24 includes a fourth driver 242, a modulation circuit 241, and an eighth driver 245.

Among components included in the processing circuit according to the first modification, a component denoted by the same symbol as that of a component of the embodiment have the same function as that of the component of the embodiment. Therefore, description of a component denoted by the same symbol as that of a component of the embodiment will be omitted.

The control signal generating circuit 252*a* receives write data of track #n from the media write data generating circuit 251 and acquires write data of track #(n−1) from the DRAM 29. The control signal generating circuit 252*a* determines, between the write data of track #n and the write data of track #(n−1), whether or not the combination of respective data sequences corresponds to a specific combination and whether or not the combination of polarities at the bit positions of the respective tracks 41 corresponds to a specific combination. Then, the control signal generating circuit 252*a* generates a boost and shrink control signal on the basis of these determination results. The boost and shrink control signal is a ternary signal obtained by integrating the boost control signal and the shrink control signal.

The boost and shrink control signal is transferred to the preamplifier 24 via the seventh driver 256.

In the preamplifier 24, the eighth driver 245 receives the boost control signal.

The boost and shrink control signal received by the eighth driver 245 is transferred to the modulation circuit 241. The modulation circuit 241 controls the fourth driver 242 on the basis of the boost and shrink control signal.

FIG. 12 is a diagram illustrating an example of the waveform of a boost and shrink control signal according to the first modification. According to this figure, the boost and shrink control signal has three levels. In the boost and shrink control signal, the "H" level indicates a command to increase the amplitude of the recording current. The "L" level indicates a command to decrease the amplitude of the recording current. The boost and shrink control signal increases or decreases the amplitude of the OSA portion as in the example illustrated in FIG. 8.

Second Modification

In the embodiment, it is based on the premise that two bit positions adjacent to each other in the radial direction in which the bit pair is written are aligned in the radial direction. However, although control is performed to align the two bit positions in the radial direction, there may be a case where a deviation in the circumferential direction occurs between the two bit positions for some reason. In a case where the amount of such deviation exceeds a predetermined value, the recording quality of the data of the adjacent track may be rather deteriorated by the control of the modulation of the recording current.

Therefore, in a second modification, a magnetic disk device 1 stops the control of modulation of the recording current depending on the positional deviation amount in the circumferential direction of the two bit positions. This prevents the recording quality of data of the adjacent track from being deteriorated by the control of the modulation of the recording current. The second modification will be described below. Note that the second modification can be used in combination with the first modification.

Figure 13:
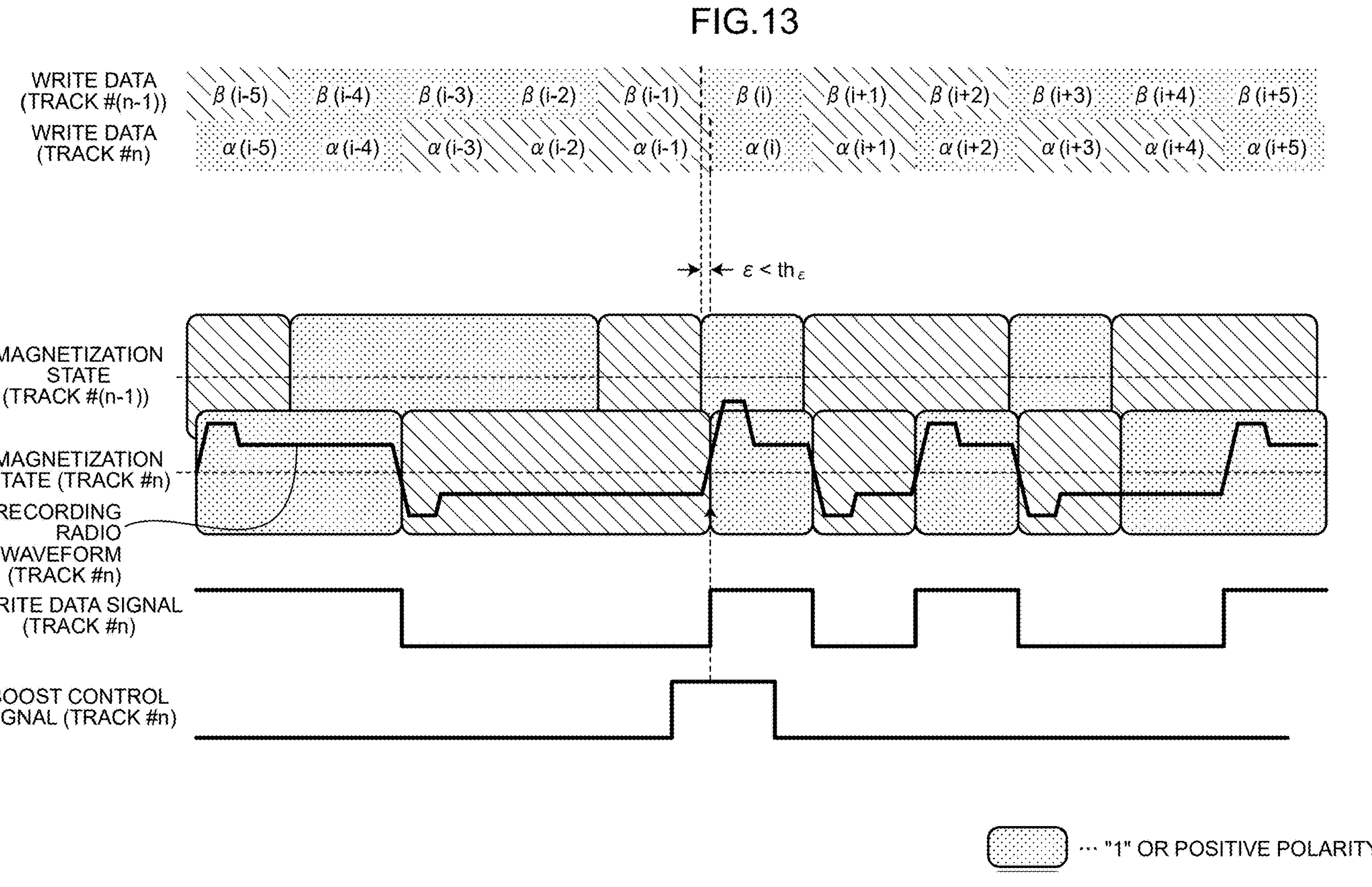
FIG. 13 is a diagram for describing an example in which two bit positions adjacent to each other in the radial direction are shifted in the circumferential direction in a second modification.

FIGS. 13 and 14 are diagrams describing an example in which two bit positions adjacent to each other in the radial direction are shifted in the circumferential direction in the second modification.

According to FIGS. 13 and 14, the bit position where $\alpha(i)$ is written is shifted by a positional deviation amount $\varepsilon$ in the circumferential direction with respect to the bit position where $\beta(i)$ is written.

In the example of FIG. 13, the positional deviation amount $\varepsilon$ is relatively small. However, in the example of FIG. 14, the positional deviation amount $\varepsilon$ is relatively large and is close to about half of the radial width (denoted as unit bit width) in which $\beta(i)$ is written.

In a case where the positional deviation amount E is large as in the example of FIG. 14, performing the modulation for increasing the amplitude of the recording current at the time of writing α(i) may adversely affect the magnetization of the bit position where β(i+1) is written.

Therefore, a predetermined threshold value (denoted as a threshold value $th_ε$) is given for the positional deviation amount ε, and in a case where the positional deviation amount ε is greater than the threshold value $th_ε$, control for modulating the recording current is avoided.

For example, in the case illustrated in FIG. 13, since the positional deviation amount ε is smaller than the threshold value $th_ε$, the preamplifier 24 is instructed to increase the amplitude of the recording current by the boost control signal at the time of writing α(i). In response to this instruction, it is increased at the OSA portion at the time of writing α(i).

In the case illustrated in FIG. 14, the positional deviation amount ε is greater than the threshold value $th_ε$. Accordingly, the boost control signal is maintained at "L" at the time of writing α(i). Therefore, at the time of writing α(i), control for increasing the amplitude of the recording current is avoided.

Note that in a case where the positional deviation amount ε is an integral multiple of the unit bit width or greater than an integral multiple of the unit bit width, bit pairs are rearranged. More specifically, a bit pair is constituted by a write target bit and a bit of an adjacent track that is written at the bit position having the smallest amount of deviation in the circumferential direction with respect to the bit position where the write target bit is written.

Figure 15:
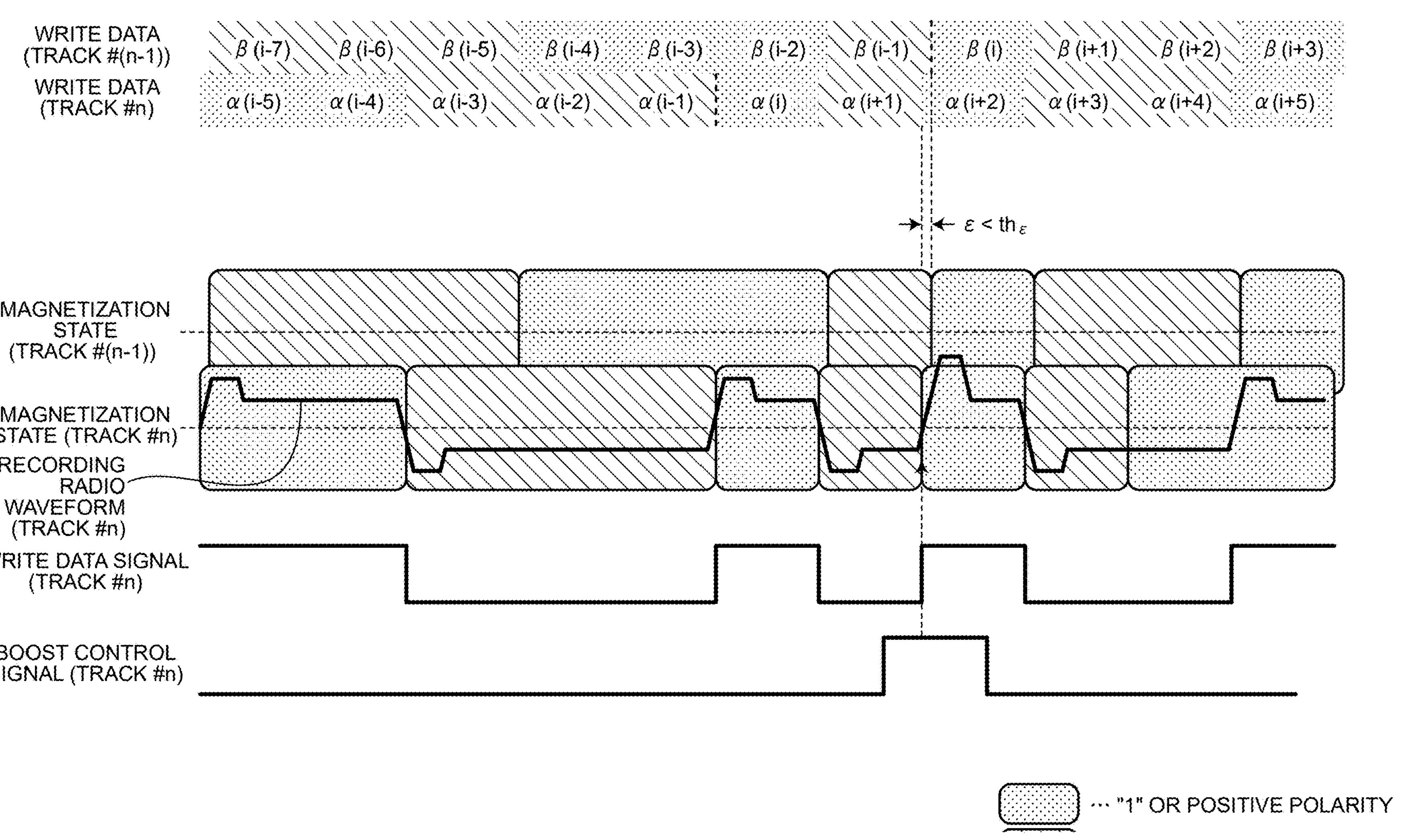
FIG. 15 is yet another diagram for describing an example in which two bit positions adjacent to each other in the radial direction are shifted in the circumferential direction in the second modification.

For example, in the example illustrated in FIG. 15, the bit position at which α(i) is written is separated from the bit position at which β(i) is written by a distance greater than or equal to the unit bit width. However, the deviation amount in the circumferential direction with respect to the bit position where β(i) is written is the minimum at the bit position where α(i+2) is written. Therefore, a bit pair is constituted by α(i+2) and β(i), and it is determined whether or not to control the modulation of the recording current on the basis of the positional deviation amount ε for the bit pair. In addition, for the bit pair, the processing circuit compares data sequences and the polarity.

Figure 16:
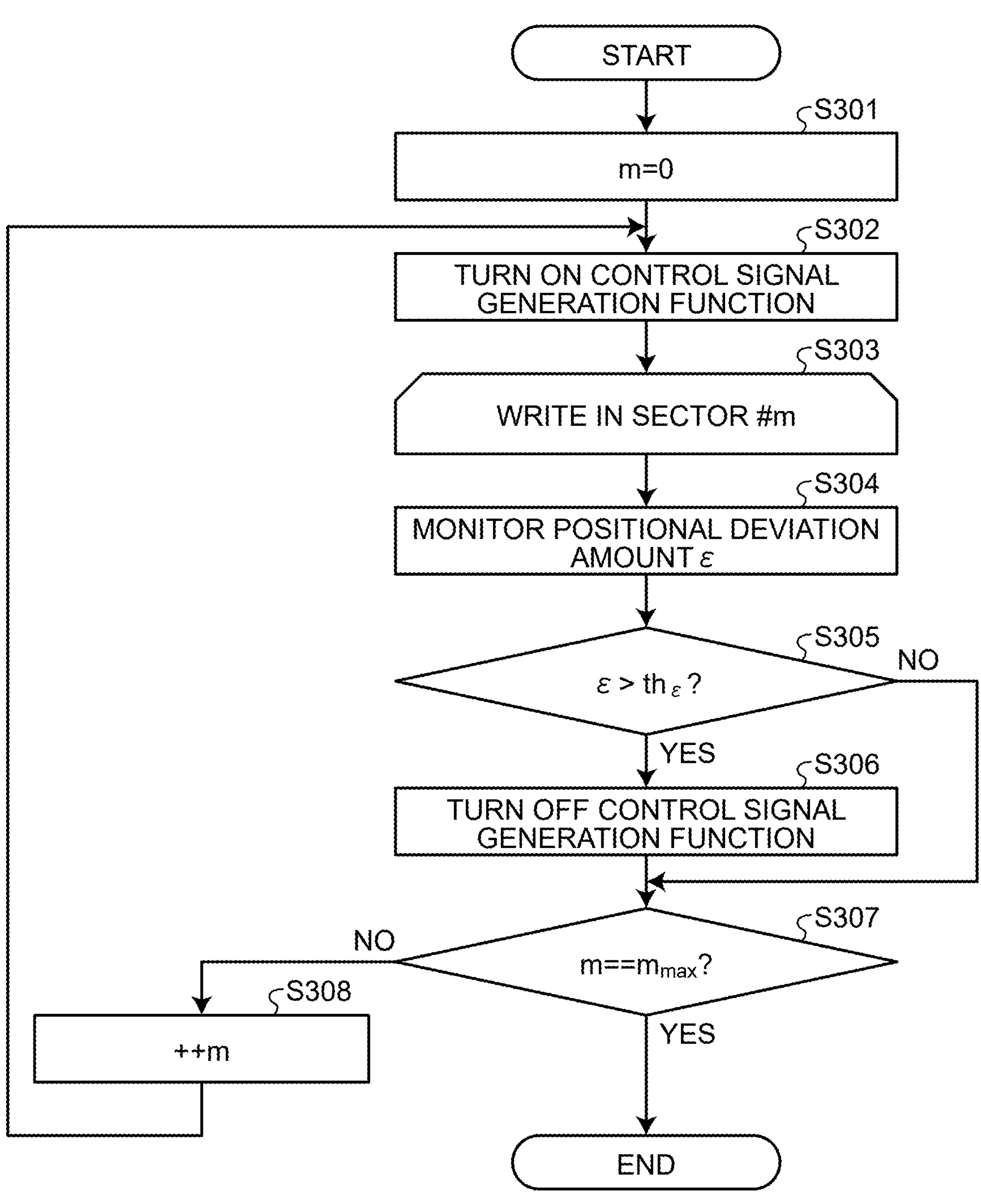
FIG. 16 is a flowchart illustrating an example of control corresponding to a positional deviation amount according to the second modification.

FIG. 16 is a flowchart illustrating an example of control depending on the positional deviation amount ε according to the second modification. Note that the series of operations illustrated in this drawing is executed by a predetermined component (for example, the processor 26) in an SoC 30. In this example, description is given on the premise that the SoC 30 is the subject of the series of operations. The drawing also illustrates an operation of a case where writing is performed from the head sector to the tail sector of the write target track.

The SoC 30 first initializes, to 0, an index m for counting sectors (S301). Then, the SoC 30 turns on the generation function of the control signal (namely, the boost control signal and the shrink control signal of the embodiment or the boost and shrink control signal of the first modification) (S302). As a result, the RWC 25 generates the control signal to enable modulation of the recording current.

Subsequently, the SoC 30 writes in a sector #m (S303). When writing in the sector #m, the SoC 30 monitors the positional deviation amount ε (S304). The SOC 30 may detect the positional deviation amount ε every time one bit is written to the sector #m or may detect the positional deviation amount ε every time data of a size larger than one bit is written to the sector #m. Moreover, the method of detecting the positional deviation amount ε is not limited to a specific method. In one example, the SoC 30 may detect the positional deviation amount ε on the basis of servo information.

During the monitoring of the positional deviation amount ε, the SoC 30 determines whether or not the positional deviation amount ε is larger than the threshold value $th_ε$ (S305). If the positional deviation amount ε exceeds the threshold value $th_ε$ at any timing during writing in the sector #m (S305: Yes), the SoC 30 turns off the control signal generation function at the timing when the positional deviation amount ε exceeds the threshold value the (S306). As a result, the RWC 25 stops generating the control signal, and the modulation of the recording current is not performed.

If the positional deviation amount ε is not larger than the threshold value $th_ε$ (S305: No), the SoC 30 skips the processing of S306.

When writing in the sector #m is completed, the SoC 30 determines whether or not the value of m is equal to the maximum value $m_{max}$ (S307). Note that $m_{max}$ corresponds to the number of sectors included in the write target track and that a sector #$m_{max}$ indicates the sector in the tail of the write target track.

If the value of m is not equal to the maximum value $m_{max}$ (S307: No), the SoC 30 increments the value of m by 1 (S308), and the control transitions to S302.

Note that the control signal generation function is turned on in step S302. In a case where writing in a previous sector is completed without the control signal generation function being turned off, the SoC 30 skips the processing of S302 and maintains the control signal generation function in the on state.

As described above, according to the second modification, the SoC 30 stops the control of the modulation of the recording current as the positional deviation amount ε in the circumferential direction of the two bit positions adjacent to each other in the radial direction becomes larger than the threshold value $th_ε$.

Therefore, it is possible to prevent deterioration of the recording quality of the data of the adjacent track due to the modulation of the recording current in the case where the positional deviation amount ε is greater than or equal to the predetermined value.

The operation when the positional deviation amount ε exceeds the threshold value $th_ε$ is not limited to stopping the modulation of the recording current.

Figure 17:
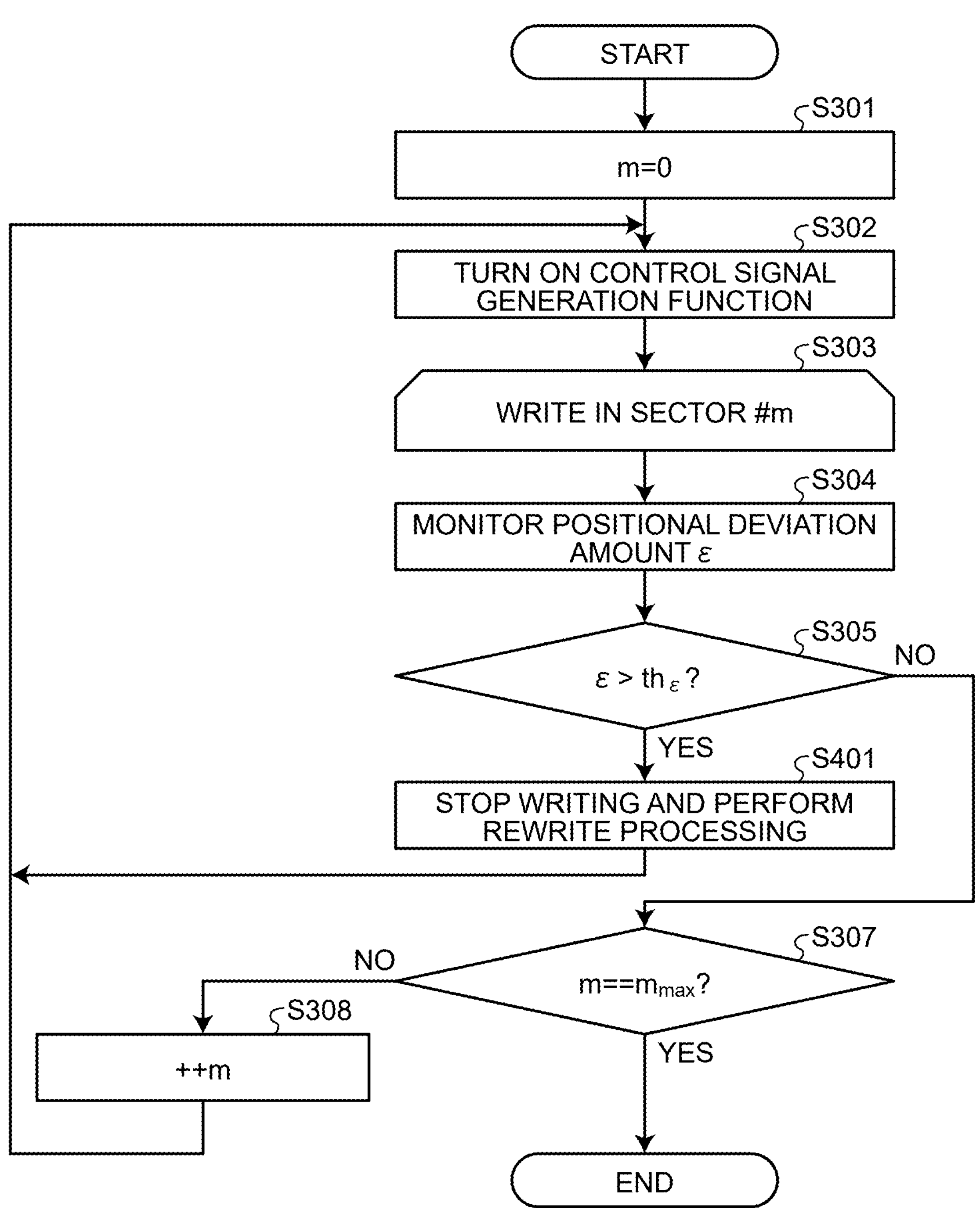
FIG. 17 is a flowchart illustrating another example of control corresponding to the positional deviation amount according to the second modification.

FIG. 17 is a flowchart illustrating another example of control corresponding to the positional deviation amount ε according to the second modification. Note that, regarding the series of operations illustrated in this drawing, description of the same matters as the matters illustrated in FIG. 16 is omitted.

Also in the example illustrated in FIG. 17, the processing of S301 to S305 is executed similarly to the example illustrated in FIG. 16. If the positional deviation amount ε exceeds the threshold value $th_ε$ at any timing during writing in the sector #m (S305: Yes), the SoC 30 stops writing and performs rewrite processing (S401). The rewrite processing is to wait for rotation of the magnetic disk 11 after stopping writing and then to execute writing of data, of the portion where writing has been stopped, again. In this case, writing in the sector #m is executed again from the head of the sector #m.

As described above, the SoC 30 may stop writing data as the positional deviation amount ε in the circumferential direction of two bit positions adjacent to each other in the radial direction becomes larger than the threshold value $th_ε$, wait for the rotation of the magnetic disk 11 after stopping the writing, and execute the writing of data again.

Figure 18:
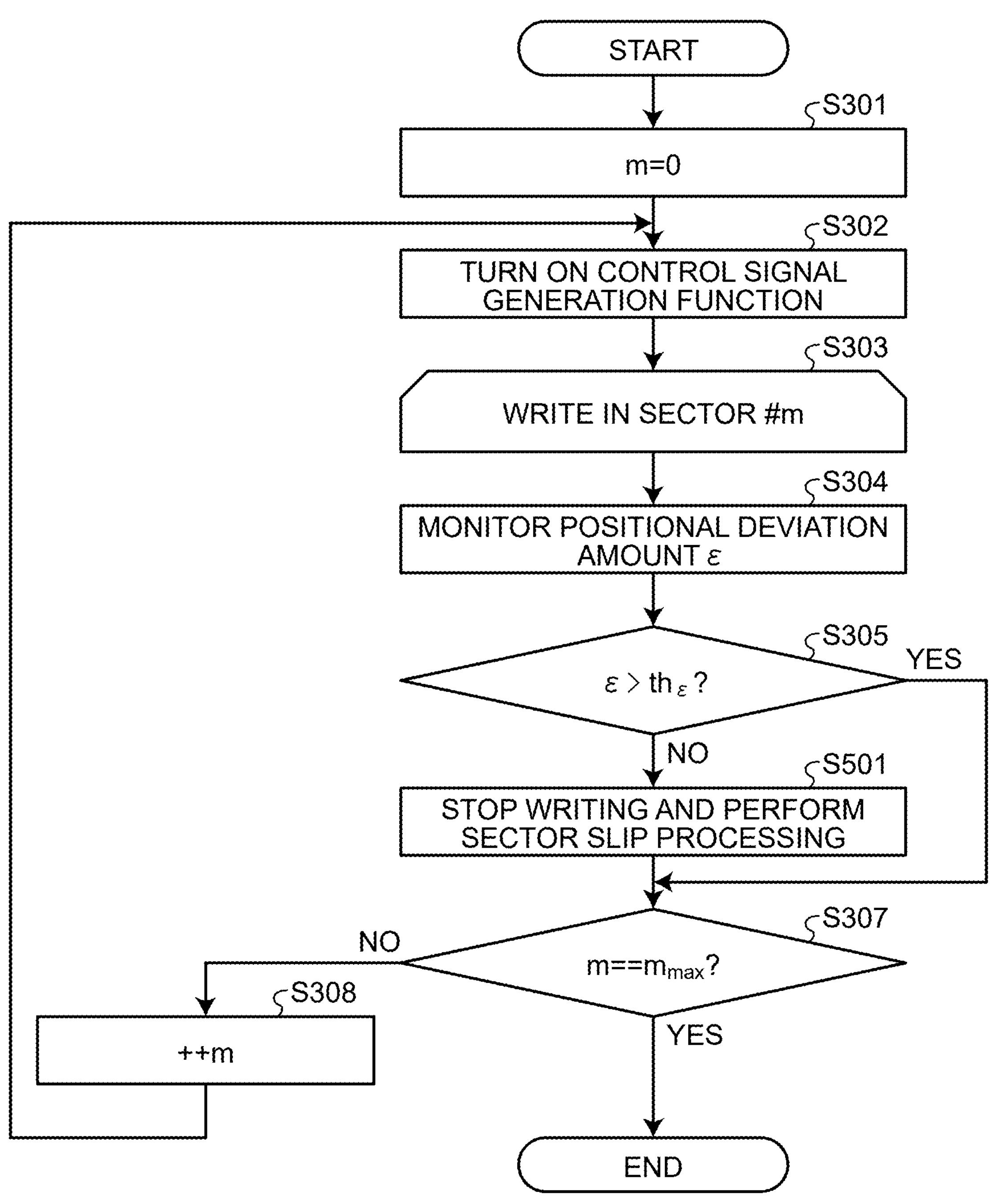
FIG. 18 is a flowchart illustrating still another example of the control corresponding to the positional deviation amount according to the second modification.

FIG. 18 is a flowchart illustrating still another example of the control corresponding to a positional deviation amount ε according to the second modification. Note that, regarding the series of operations illustrated in this drawing, description of the same matters as the matters illustrated in FIG. 16 is omitted.

Also in the example illustrated in FIG. 18, the processing of S301 to S305 is executed similarly to the example illustrated in FIG. 16. If the positional deviation amount ε exceeds the threshold value $th_ε$ at any timing during writing in the sector #m (S305: Yes), the SoC 30 stops writing in the sector #m and performs sector slip processing (S501). The sector slip processing is to restart writing from a position different from the position where the writing has been stopped, more precisely, the head of a next sector after the writing is stopped.

As described above, the SoC 30 may stop writing data as the positional deviation amount ε in the circumferential direction of two bit positions adjacent to each other in the radial direction becomes larger than the threshold value $th_ε$ and execute the sector slip processing again.

Third Modification

In the embodiment, the recording current is modulated. The amplitude of the recording current affects the recording width in the write target bit, namely, the radial width of a range that is magnetized. For example, when the amplitude of the recording current is increased, the recording width is widened at the position where the amplitude of the recording current in the write target track is increased. When the amplitude of the recording current is increased, the recording width is narrowed at the position where the amplitude of the recording current in the write target track is reduced. That is, it is conceivable that the recording width of the write target track is modulated by the control of the modulation of the recording current and that the recording quality of the adjacent bit is thereby improved.

The method of modulating the recording width of the write target track is not limited to modulation of the recording current. As a third modification, a method of modulating the recording width of the write target track in a manner different from the modulation of the recording current will be described. Note that the third modification can be applied not only to the embodiment but also to any of the first and second modifications.

As a method for magnetizing a magnetic disk, an energy-assisted recording method is known. The energy-assisted recording method enables magnetization of a magnetic disk even with a small recording current by giving some energy to the magnetic disk.

Examples of the energy-assisted recording method include a microwave assisted magnetic recording (MAMR) method and a heat assisted magnetic recording (HAMR) method.

According to the microwave assisted magnetic recording method, a microwave is applied to a magnetic disk, whereby the magnetic field required for magnetization of the magnetic disk is reduced. According to the heat assisted magnetic recording method, a magnetic disk is locally heated by near-field light or the like, whereby the coercive force of the magnetic disk is reduced.

In a case where the energy-assisted recording method is adopted, the magnetic head 22 includes an assist element capable of applying energy to the magnetic disk 11. The assist element generates a microwave or near-field light. The RWC 25 can control the recording width by controlling the energy assist amount, namely, the intensity of the microwave or the near-field light generated in the assist element. The RWC 25 can increase the recording width more as the energy assist amount is increased more.

More specifically, the RWC 25 has a configuration similar to that of the embodiment and generates the control signal (the boost control signal and the shrink control signal). The preamplifier 24 changes the energy assist amount depending on the received control signal. The preamplifier 24 increases the energy assist amount in response to the boost control signal and decreases the energy assist amount in response to the shrink control signal.

As described above, the processing circuit may modulate the recording width by controlling the energy assist amount. Even in a case where the recording width is modulated by the control of the energy assist amount instead of the modulation of the recording current, similar effects to those of the embodiment can be obtained.

In the embodiment and the first to third modifications, the SMR method is adopted. The technology described in the embodiment and the first to third modifications can also be applied to a magnetic disk device adopting the CMR method.

SUPPLEMENTARY NOTE

According to the first embodiment and the first to third modifications, aspects noted below are provided.

Supplementary Note 1

A magnetic disk device comprising:

a magnetic disk including a plurality of tracks;

a magnetic head that writes data to and reads data from the magnetic disk; and a processing circuit that modulates a recording width in a radial direction of a first data sequence depending on a first combination and a second combination when data is written in a first track among the plurality of tracks by the magnetic head, the first data sequence being the data to be written in the first track, the first track being a track adjacent to a second track that is a track on which the data is already written among the plurality of tracks, the first combination being a combination of the first data sequence and a second data sequence that is data already written in the second track, the second combination being a combination of polarities at a bit position of the first track and a bit position of the second track adjacent to each other in the radial direction.

Supplementary Note 2

The magnetic disk device according to Supplementary Note 1, wherein the processing circuit increases the recording width in the radial direction at the bit position of the first track when the second combination corresponds to a combination of a same polarity.

Supplementary Note 3

The magnetic disk device according to Supplementary Note 1, wherein the processing circuit reduces the recording width in the radial direction at the bit position of the first track when the second combination corresponds to a combination of different polarities.

Supplementary Note 4

The magnetic disk device according to any one of Supplementary Notes 1 to 3, wherein the processing circuit:

is set with a first data pattern and a second data pattern, and executes modulation of the recording width depending on the second combination in a case where both a condition that the first data sequence coincides with the first data pattern and a condition that the second data sequence coincides with the second data pattern are satisfied.

Supplementary Note 5

The magnetic disk device according to any one of Supplementary Notes 1 to 4, further comprising:

a controller that stops control of modulation of the recording width in response to a positional deviation amount in a circumferential direction between the bit position of the first track and the bit position of the second track adjacent to each other in the radial direction exceeding a threshold value.

Supplementary Note 6

The magnetic disk device according to any one of Supplementary Notes 1 to 4, further comprising:

a controller that stops writing data to the first track in response to a positional deviation amount in a circumferential direction between the bit position of the first track and the bit position of the second track adjacent to each other in the radial direction exceeding a threshold value, waits for rotation of the magnetic disk after stopping the writing, and executes writing of the data again.

Supplementary Note 7

The magnetic disk device according to any one of Supplementary Notes 1 to 4, further comprising:

a controller that stops writing data to the first track in response to a positional deviation amount in a circumferential direction between the bit position of the first track and the bit position of the second track adjacent to each other in the radial direction exceeding a threshold value, and after stopping the writing, restarts writing data to the first track from a position different from a position where the writing has been stopped.

Supplementary Note 8

The magnetic disk device according to any one of Supplementary Notes 1 to 7, wherein the processing circuit modulates an amplitude of a recording current supplied to the magnetic head to modulate the recording width.

Supplementary Note 9

The magnetic disk device according to any one of Supplementary Notes 1 to 7, wherein the magnetic head includes an assist element that applies energy to the magnetic disk, and the processing circuit controls an amount of the energy applied to the magnetic disk by the assist element to modulate the recording width.

Supplementary Note 10

The magnetic disk device according to any one of Supplementary Notes 1 to 9, wherein the processing circuit comprises a read and write channel and a preamplifier electrically connected to the read and write channel and the magnetic head, and the read and write channel generates a control signal indicating whether or not to execute modulation of the recording width and transfers the control signal to the preamplifier.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk including a plurality of tracks;

a magnetic head that writes data to and reads data from the magnetic disk; and a processing circuit that modulates a recording width in a radial direction of a first data sequence depending on a first combination and a second combination when data is written in a first track among the plurality of tracks by the magnetic head, the first data sequence being the data to be written in the first track, the first track being a track adjacent to a second track that is a track on which the data is already written among the plurality of tracks, the first combination being a combination of the first data sequence and a second data sequence that is data already written in the second track, the second combination being a combination of polarities at a bit position of the first track and a bit position of the second track adjacent to each other in the radial direction.

2. The magnetic disk device according to claim 1, wherein the processing circuit increases the recording width in the radial direction at the bit position of the first track when the second combination corresponds to a combination of a same polarity.

3. The magnetic disk device according to claim 1, wherein the processing circuit reduces the recording width in the radial direction at the bit position of the first track when the second combination corresponds to a combination of different polarities.

4. The magnetic disk device according to claim 1, wherein the processing circuit:

is set with a first data pattern and a second data pattern, and executes modulation of the recording width depending on the second combination in a case where both a condition that the first data sequence coincides with the first data pattern and a condition that the second data sequence coincides with the second data pattern are satisfied.

5. The magnetic disk device according to claim 1, further comprising:

a controller that stops control of modulation of the recording width in response to a positional deviation amount in a circumferential direction between the bit position of the first track and the bit position of the second track adjacent to each other in the radial direction exceeding a threshold value.

6. The magnetic disk device according to claim 1, further comprising:

a controller that stops writing data to the first track in response to a positional deviation amount in a circumferential direction between the bit position of the first track and the bit position of the second track adjacent to each other in the radial direction exceeding a threshold value, waits for rotation of the magnetic disk after stopping the writing, and executes writing of the data again.

7. The magnetic disk device according to claim 1, further comprising:

a controller that stops writing data to the first track in response to a positional deviation amount in a circumferential direction between the bit position of the first track and the bit position of the second track adjacent to each other in the radial direction exceeding a threshold value, and after stopping the writing, restarts writing data to the first track from a position different from a position where the writing has been stopped.

8. The magnetic disk device according to claim 1, wherein the processing circuit modulates an amplitude of a recording current supplied to the magnetic head to modulate the recording width.

9. The magnetic disk device according to claim 1, wherein the magnetic head includes an assist element that applies energy to the magnetic disk, and the processing circuit controls an amount of the energy applied to the magnetic disk by the assist element to modulate the recording width.

10. The magnetic disk device according to claim 1, wherein the processing circuit comprises a read and write channel and a preamplifier electrically connected to the read and write channel and the magnetic head, and the read and write channel generates a control signal indicating whether or not to execute modulation of the recording width and transfers the control signal to the preamplifier.

11. A method comprising writing data to a first track among a plurality of tracks included in a magnetic disk using a magnetic head, wherein the first track is a track adjacent to a second track that is a track on which data is already written among the plurality of tracks, and the writing includes modulating a recording width in a radial direction of a first data sequence depending on a first combination and a second combination, the first data sequence being the data to be written in the first track, the first combination being a combination of the first data sequence and a second data sequence that is the data already written in the second track, the second combination being a combination of polarities at a bit position of the first track and a bit position of the second track adjacent to each other in the radial direction.

12. The method according to claim 11, wherein the modulating includes increasing the recording width in the radial direction at the bit position of the first track in response to the second combination corresponding to a combination of a same polarity.

13. The method according to claim 12, wherein the modulating includes modulating an amplitude of a recording current supplied to the magnetic head to modulate the recording width.

14. The method according to claim 12, wherein the magnetic head includes an assist element that applies energy to the magnetic disk, and the modulating includes controlling an amount of the energy applied to the magnetic disk by the assist element to modulate the recording width.

15. The method according to claim 11, wherein the modulating includes reducing the recording width in the radial direction at the bit position of the first track in response to the second combination corresponding to a combination of different polarities.

16. The method according to claim 11, wherein the writing further includes executing modulation of the recording width depending on the second combination in response to both a condition that the first data sequence coincides with a first data pattern and a condition that the second data sequence coincides with a second data pattern being satisfied.

17. The method according to claim 11, wherein the writing further includes stopping control of modulation of the recording width in response to a positional deviation amount in a circumferential direction between the bit position of the first track and the bit position of the second track adjacent to each other in the radial direction exceeding a threshold value.

18. The method according to claim 11, wherein the writing further includes:

stopping writing data to the first track in response to a positional deviation amount in a circumferential direction between the bit position of the first track and the bit position of the second track adjacent to each other in the radial direction exceeding a threshold value; and waiting for rotation of the magnetic disk after stopping the writing and executing writing of the data again.

19. The method according to claim 11, wherein the writing further includes:

stopping writing data to the first track in response to a positional deviation amount in a circumferential direction between the bit position of the first track and the bit position of the second track adjacent to each other in the radial direction exceeding a threshold value; and after stopping the writing, restarting writing data to the first track from a position different from a position where the writing has been stopped.

20. The method according to claim 11, wherein the modulating includes modulating an amplitude of a recording current supplied to the magnetic head to modulate the recording width.

* * * * *